(12) United States Patent
Jansen et al.

(10) Patent No.: US 9,515,531 B2
(45) Date of Patent: Dec. 6, 2016

(54) BEARINGLESS FLYWHEEL SYSTEMS, WINDING AND CONTROL SCHEMES, AND SENSORLESS CONTROL

(71) Applicant: The United States of America, as represented by the Administrator of the National Aeronautics and Space Administration, Washington, DC (US)

(72) Inventors: Ralph H Jansen, Westlake, OH (US);
Larry M Trase, Litchfield, OH (US);
Timothy P Dever, Westlake, OH (US);
Peter E Kascak, Cleveland, OH (US);
Thomas G Kraft, Cleveland, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 672 days.

(21) Appl. No.: 13/723,598

(22) Filed: Dec. 21, 2012

(65) Prior Publication Data
US 2014/0028132 A1 Jan. 30, 2014

Related U.S. Application Data

(60) Provisional application No. 61/631,443, filed on Dec. 23, 2011, provisional application No. 61/583,425, filed on Jan. 5, 2012, provisional application No. 61/584,364, filed on Jan. 9, 2012.

(51) Int. Cl.
| | | |
|---|---|---|
| *H02K 7/02* | (2006.01) | |
| *H02K 5/00* | (2006.01) | |
| *H02K 7/09* | (2006.01) | |
| *H02P 9/02* | (2006.01) | |
| *H02K 5/16* | (2006.01) | |
| *F16C 32/04* | (2006.01) | |

(52) U.S. Cl.
CPC ........ *H02K 5/00* (2013.01); *H02K 5/16* (2013.01); *H02K 7/025* (2013.01); *H02K 7/09* (2013.01); *H02P 9/02* (2013.01); *F16C 32/0497* (2013.01); *Y02E 60/16* (2013.01)

(58) Field of Classification Search
CPC ............ H02K 7/09; H02K 5/16; H02K 7/025
USPC ........................................................ 310/74
See application file for complete search history.

(56) References Cited

U.S. PATENT DOCUMENTS

| | | | |
|---|---|---|---|
| 4,077,678 | A | 3/1978 | Studer et al. |
| 4,370,004 | A | 1/1983 | Morikawa et al. |
| 4,412,170 | A | 10/1983 | Roesel, Jr. |
| 4,870,310 | A | 9/1989 | Triplett |
| 5,703,423 | A | 12/1997 | Fukao et al. |
| 5,747,907 | A | 5/1998 | Miller |
| 5,760,508 | A | 6/1998 | Jennings et al. |
| 5,969,457 | A | 10/1999 | Clifton et al. |

(Continued)

*Primary Examiner* — Hanh Nguyen
(74) *Attorney, Agent, or Firm* — Robert H. Earp, III

(57) ABSTRACT

Flywheel systems are disclosed that provide increased energy density and operational effectiveness. A first bearingless motor and a second bearingless motor may be configured to simultaneously suspend the central rotor in a radial direction and to rotate the central rotor. However, certain implementations may have one motor or more than two motors, depending on the design. A plurality of the flywheel systems may be collectively controlled to perform community energy storage with higher storage capacities than individual flywheel systems.

20 Claims, 25 Drawing Sheets

(56) References Cited

U.S. PATENT DOCUMENTS

| | | | |
|---|---|---|---|
| 6,019,319 A | 2/2000 | Falbel | |
| 6,166,469 A * | 12/2000 | Osama et al. | 310/90.5 |
| 6,166,472 A | 12/2000 | Pinkerton et al. | |
| 6,262,505 B1 | 7/2001 | Hockney et al. | |
| 6,388,347 B1 * | 5/2002 | Blake et al. | 310/74 |
| 6,703,735 B1 * | 3/2004 | Gabrys | 310/90.5 |
| 6,707,187 B1 | 3/2004 | Gabrys | |
| 6,798,092 B1 * | 9/2004 | Gabrys et al. | 310/45 |
| 6,825,588 B2 | 11/2004 | Gabrys et al. | |
| 6,867,520 B2 | 3/2005 | Jennings | |
| 6,897,587 B1 * | 5/2005 | McMullen et al. | 310/90.5 |
| 6,927,517 B2 * | 8/2005 | Brunet et al. | 310/90.5 |
| 7,608,951 B2 | 10/2009 | Potter et al. | |
| 8,242,649 B2 | 8/2012 | Fradella | |
| 8,314,527 B2 | 11/2012 | Wang | |
| 2006/0238053 A1 | 10/2006 | Kascak et al. | |
| 2008/0303363 A1 | 12/2008 | Alston | |
| 2010/0231076 A1 | 9/2010 | Chiba et al. | |
| 2010/0282528 A1 | 11/2010 | Palti | |
| 2010/0283340 A1 * | 11/2010 | Fradella | 310/74 |
| 2012/0187922 A1 | 7/2012 | Dubois et al. | |
| 2012/0198960 A1 | 8/2012 | Dubois et al. | |

\* cited by examiner

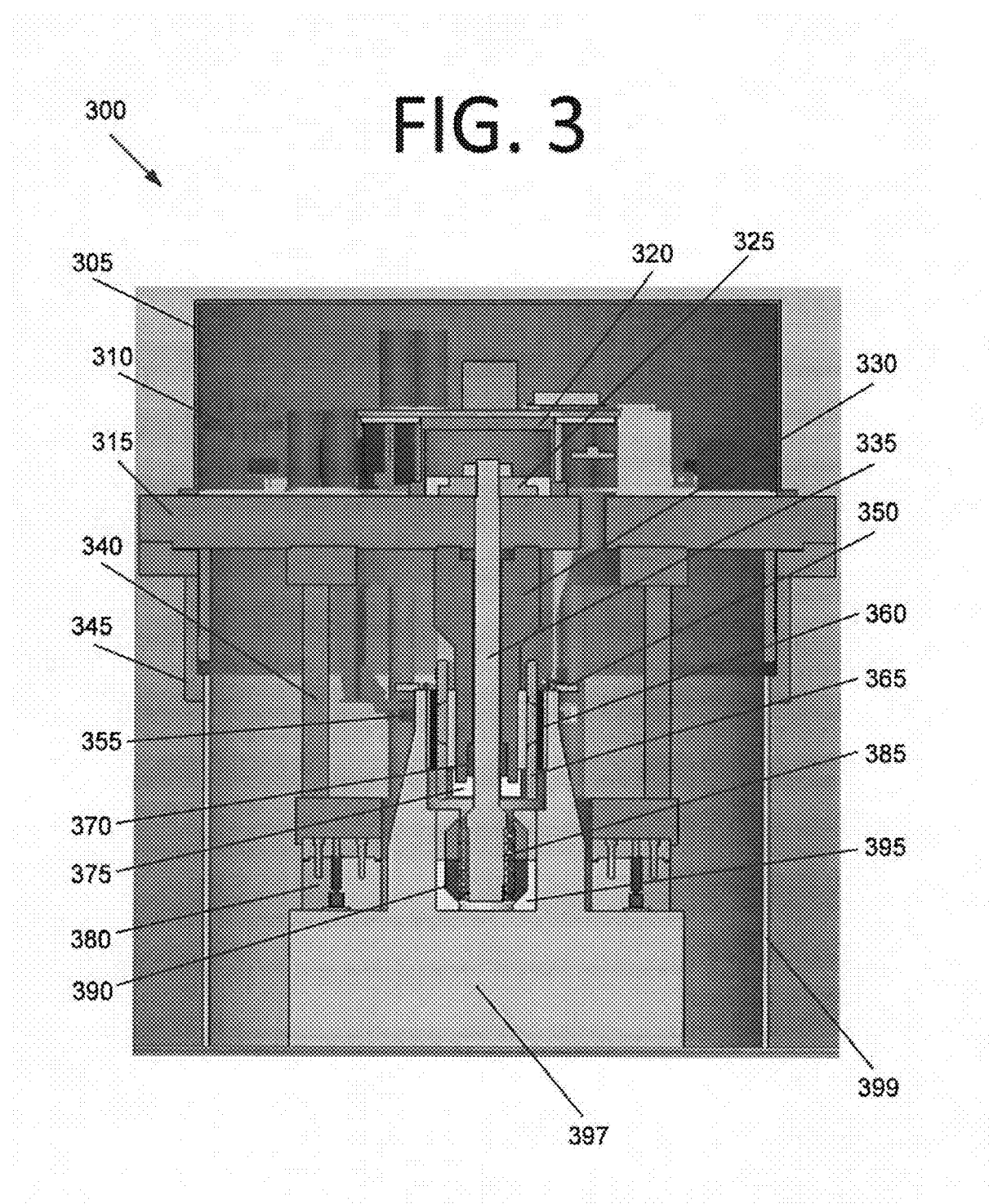

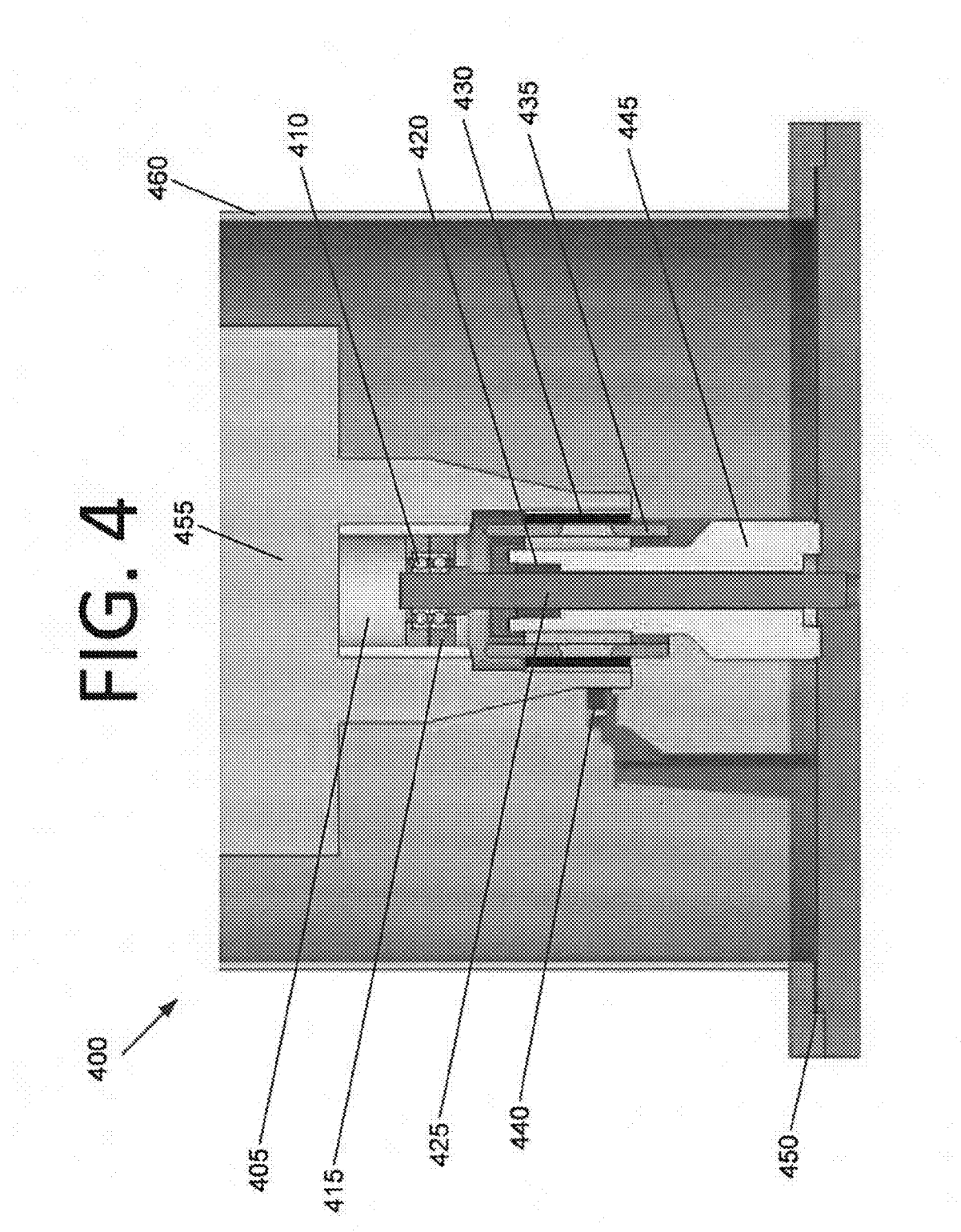

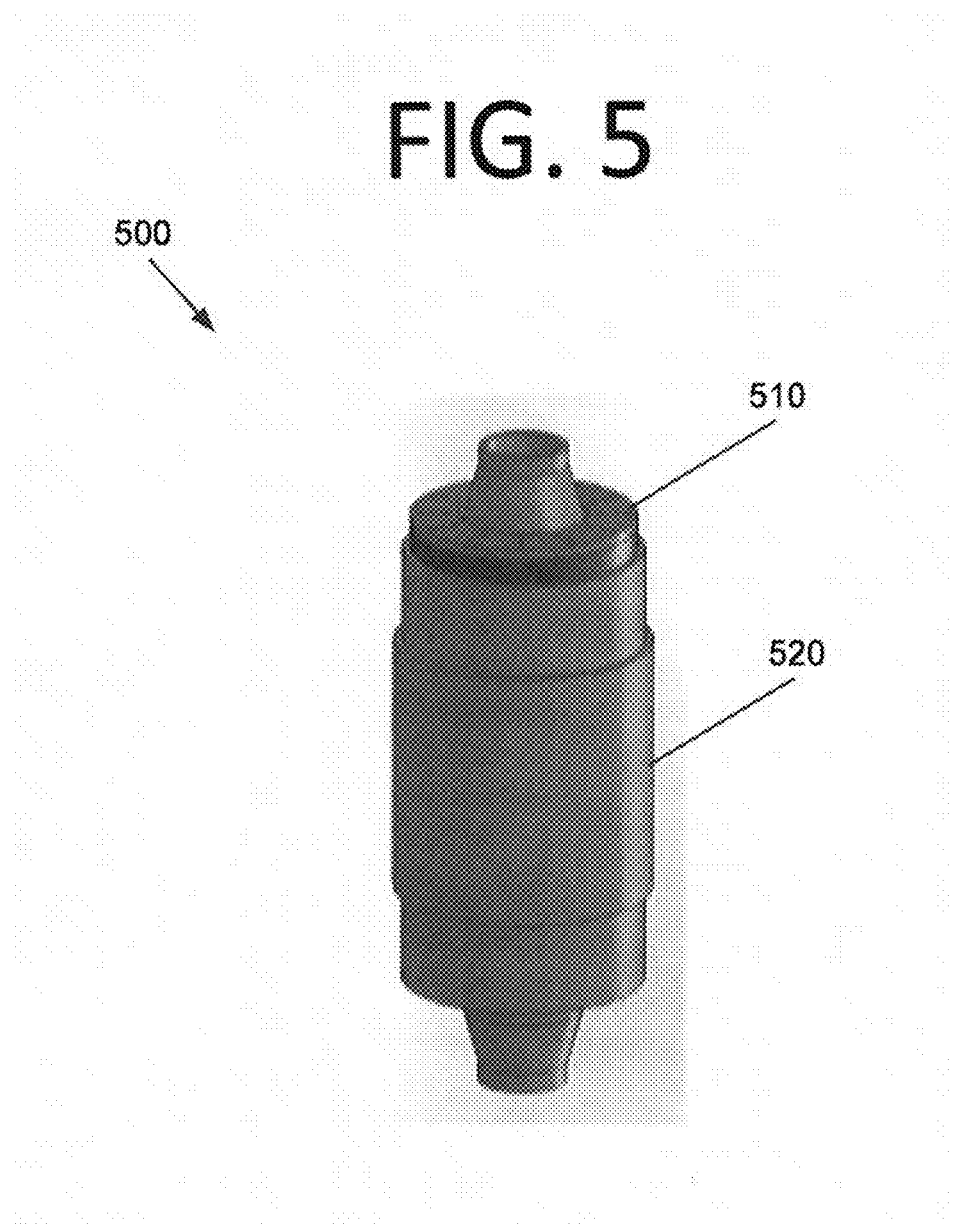

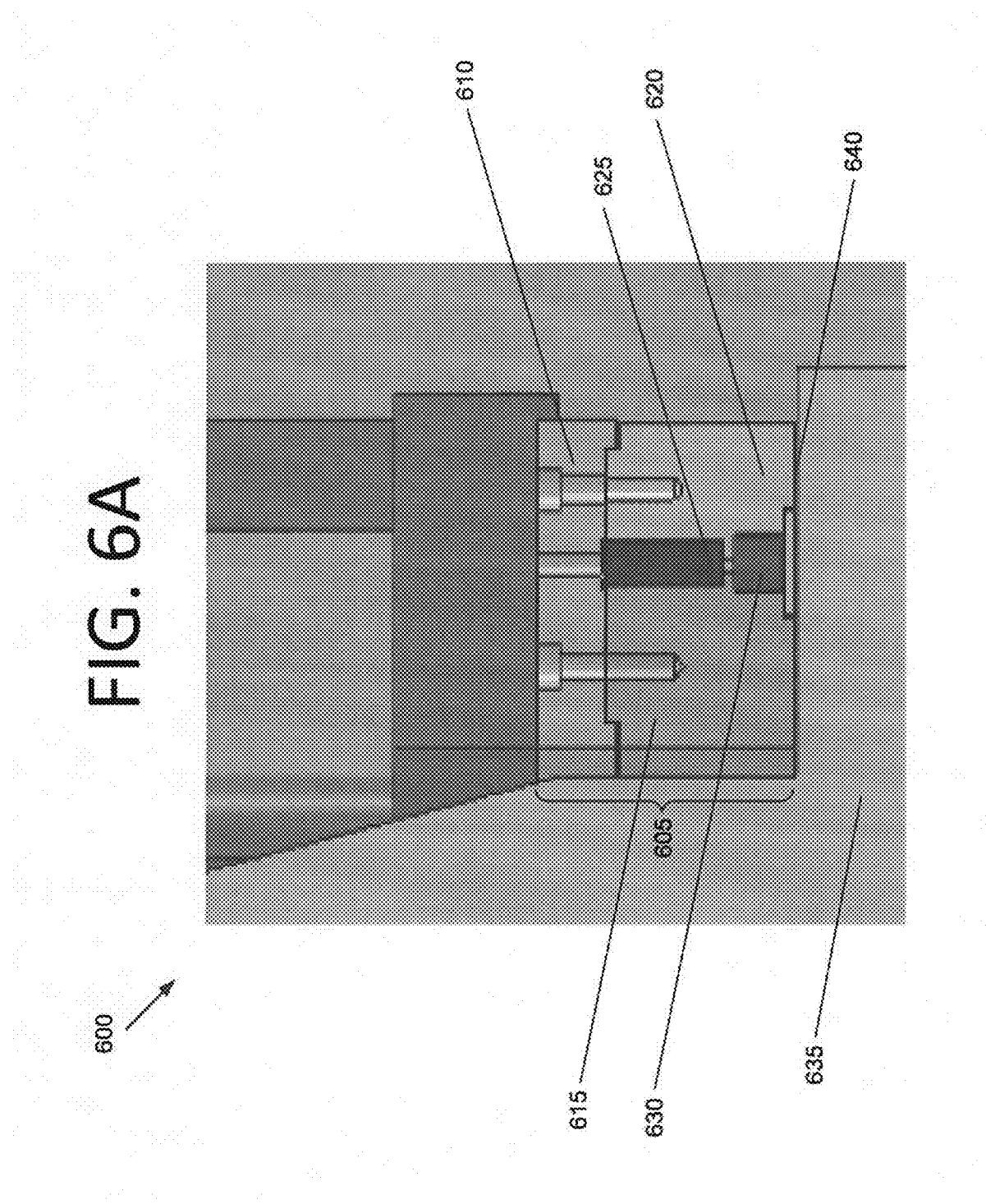

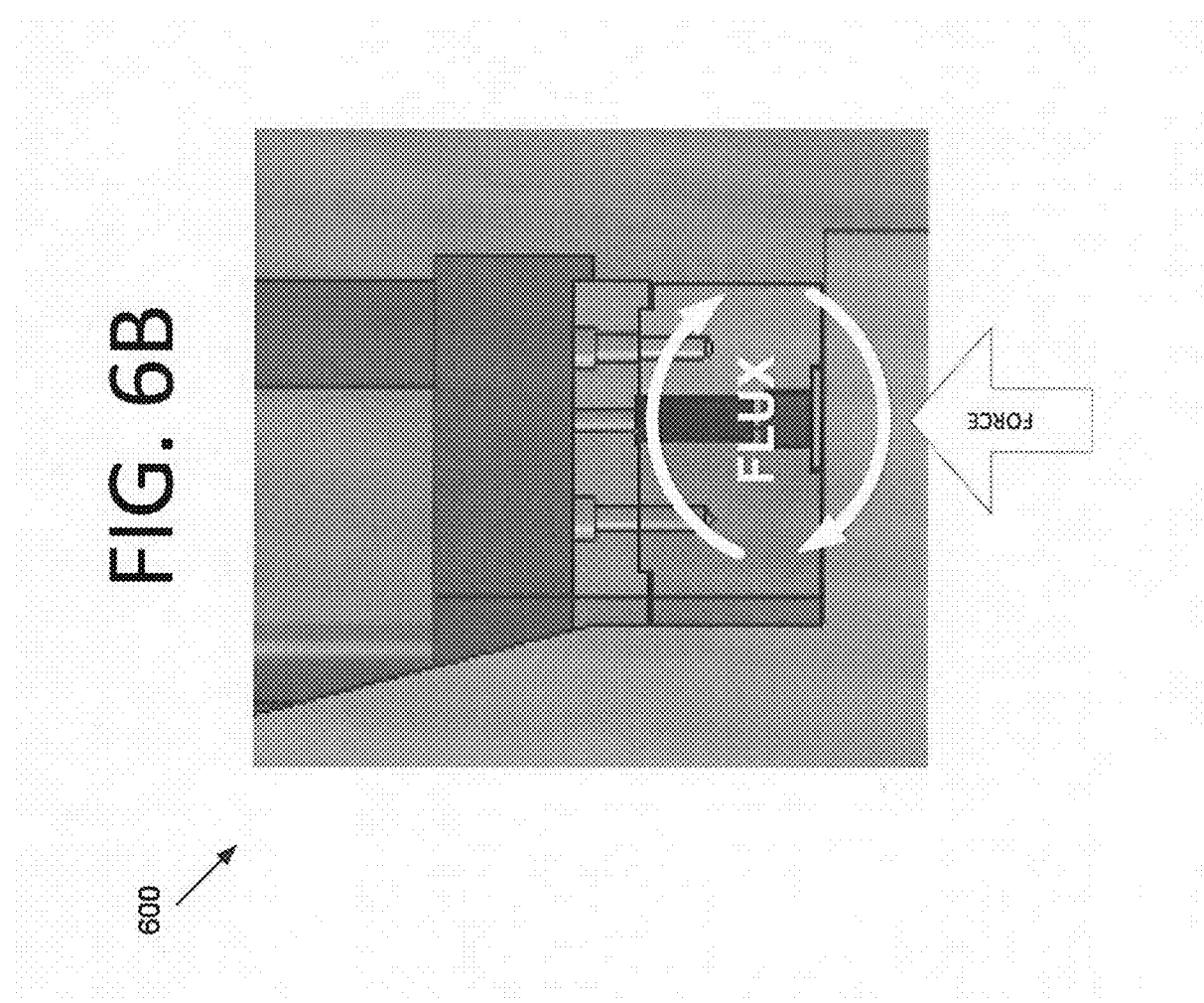

Phase C

Lap Windings

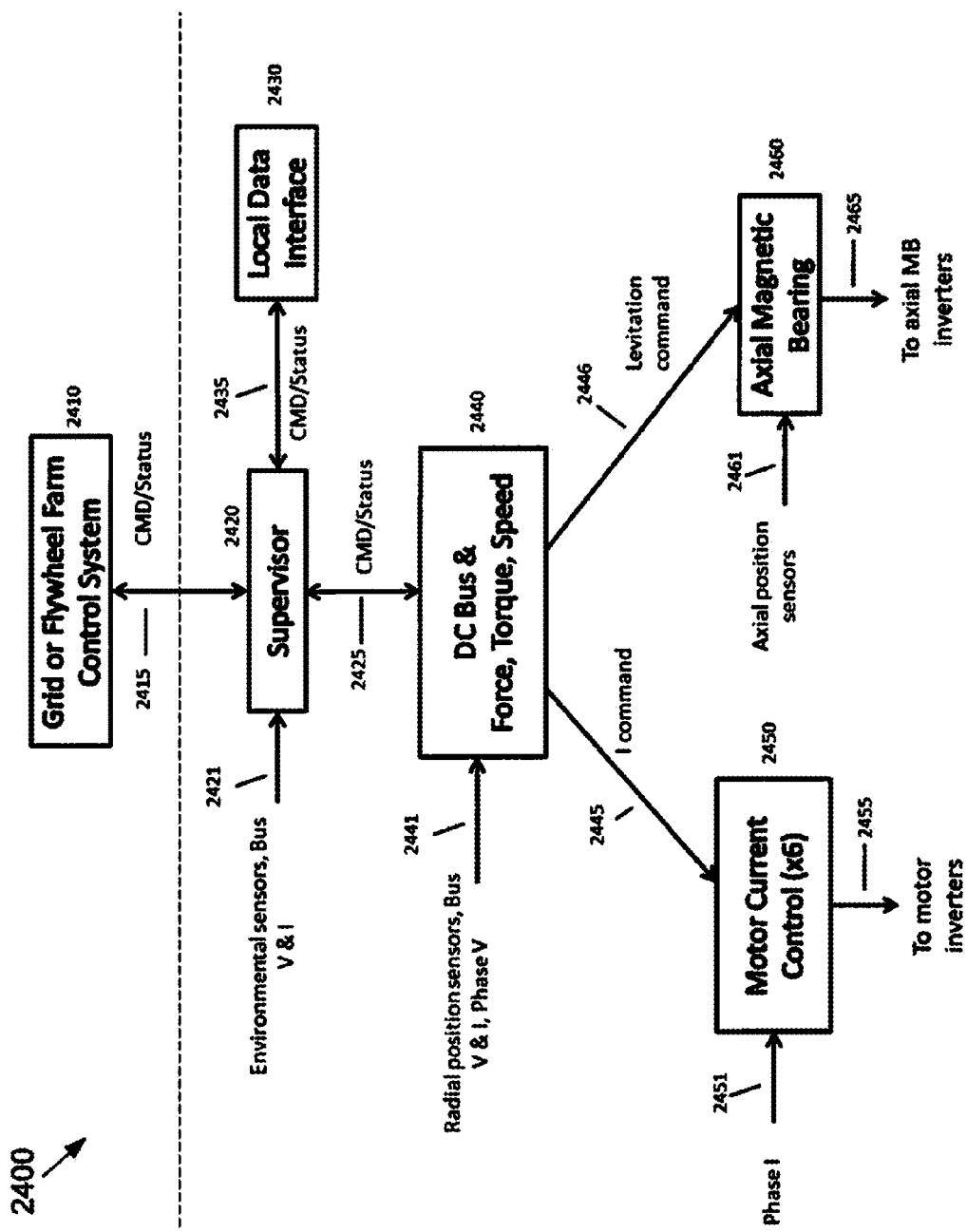

BEARINGLESS FLYWHEEL SYSTEMS, WINDING AND CONTROL SCHEMES, AND SENSORLESS CONTROL

CROSS REFERENCE TO RELATED APPLICATIONS

This application claims the benefit of U.S. Provisional Application Ser. Nos. 61/631,443, filed on Dec. 23, 2011, 61/583,425, filed on Jan. 5, 2012, and 61/584,364, filed on Jan. 9, 2012. The subject matter of these earlier filed provisional patent applications is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

The invention described herein was also made in the performance of work under a NASA contract and is subject to the provisions of Section 305 of the National Aeronautics and Space Action of 1958, Public Law 85-568 (72 Stat. 435; 42 U.S.C. 2457).

FIELD

The present invention generally pertains to flywheel systems, and more specifically, to flywheel systems with a bearingless motor/generator ("MG"), flywheel winding and control schemes, and sensorless pole-pair separated bearingless motor/generators.

BACKGROUND

Flywheel systems for power storage include a rotor that stores energy when rotated, a motor/generator ("MG") that converts energy between electrical and mechanical forms, and a bearing system that supports the rotating components. However, current flywheel-based energy storage devices are unable to provide power continuously for greater than fifteen minutes and are still too expensive for wide acceptance. For instance, the best conventional system available from the flywheel industry provides power for approximately two minutes, and the best available solution on grid runs for approximately fifteen minutes. Accordingly, an improved system design having a lower cost and higher reliability may be beneficial. Also, reducing the mass and volume and increasing the power density over conventional systems may be beneficial.

SUMMARY

Certain embodiments of the present invention may be implemented and provide solutions to the problems and needs in the art that have not yet been fully solved by conventional flywheel systems. For example, certain embodiments of the present invention drive a flywheel (i.e., a central rotor) with a bearingless motor/generator ("MG"). Such embodiments may entirely eliminate a conventional mechanical or magnetic bearing system, which leads to a reduction in mass and cost savings.

Some embodiments may employ a control approach that provides improved performance for bearingless MGs by resolving gaps in spatial magnetomotive force ("MMF") generation. Stated differently, the control approach generates symmetrical levitation forces. Certain embodiments may gather position and rotation information without using specific sensors for the task, which reduces mass and cost.

In one embodiment of the present invention, an apparatus includes a first bearingless motor and a second bearingless motor and an axial magnetic bearing configured to provide axial control. The first bearingless motor and the second bearingless motor are configured to suspend the central rotor in a radial direction and to rotate the central rotor.

In another embodiment of the present invention, an apparatus includes a bearingless motor, an axial magnetic bearing configured to provide axial control, and a central rotor. The bearingless motor and the axial magnetic bearing are configured to suspend the central rotor from above in a pendulum configuration.

In yet another embodiment of the present invention, a community energy storage system includes a plurality of flywheel systems. The community energy storage system also includes an electronic control system configured to control the plurality of flywheel systems. The community energy storage system is configured to provide community energy storage to a plurality of energy consumers.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 illustrates a side view of an upper portion of a cylindrical flywheel system, according to an embodiment of the present invention.

FIG. 4 illustrates a side view of a lower portion of a cylindrical flywheel system, according to an embodiment of the present invention.

FIG. 5 illustrates a side perspective view of an axial magnetic bearing ("AMB") that shows the location of the AMB on a rotor, according to an embodiment of the present invention.

FIG. 6A illustrates a side view of an AMB, according to an embodiment of the present invention.

FIG. 6B illustrates a side view of forces acting on the AMB of FIG. 6A, according to an embodiment of the present invention.

FIG. 24 illustrates a control system for controlling and monitoring one or more flywheel systems, according to an embodiment of the present invention.

DETAILED DESCRIPTION OF THE EMBODIMENTS

Figure 1:
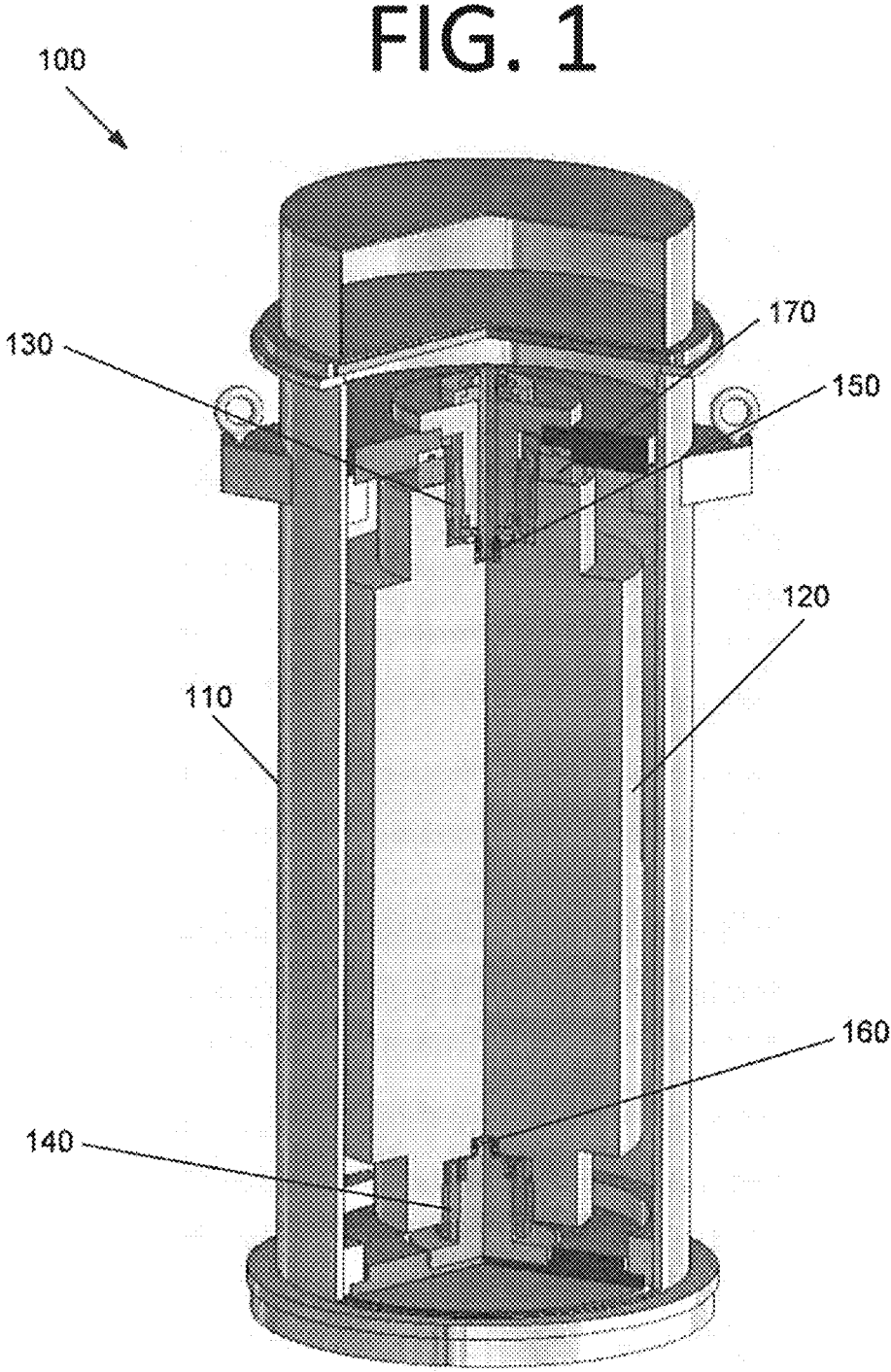
FIG. 1 illustrates a perspective cutaway view of a cylindrical flywheel system, according to an embodiment of the present invention.

Some embodiments of the present invention pertain to a novel flywheel design, novel control and winding schemes, and/or sensorless control. The advanced technologies involved, including motor, rotor and electronics designs, hold the promise to significantly increase the energy density of high speed flywheel systems, while reducing cost. The higher the energy density, the lower the mass and cost of the system. These are important factors for terrestrial and space applications. Terrestrial applications include local electrical grid energy storage.

Some embodiments of the present invention provide a flywheel system with motor/generators ("MGs") that do not have bearings. Such embodiments may be able to provide power for greater than three hours, and the technology may be benchmarked as an industry driver. This is far superior to conventional run times of two to fifteen minutes. Also, individual units in some embodiments may achieve 25 kilowatts ("kW"), 75 kilowatt-hours ("kW-h"), a 10 year operational lifetime, and a wide operating temperature range. Furthermore, the production cost of some embodiments is lower than many other energy storage technologies.

There are various benefits to local energy storage. These include providing backup power if the grid is down and providing backup power in remote, non-grid-connected areas. Flywheel systems may also be used to level peak versus average power usage, which is a large cost for utilities. This may lead to rate benefits and a reduction in power generation and distribution infrastructure.

Flywheel energy storage itself also has various benefits. The high frequency response of flywheel systems allows for the additional function of voltage regulation. Such systems also typically have a long operational lifetime, giving flywheel systems of some embodiments the potential to be a capital asset instead of an operational cost. Furthermore, flywheel systems tend to have a low environmental impact since, unlike other energy storage systems such as chemical batteries, flywheels generally do not contain chemicals or hazardous materials.

In certain embodiments, multiple flywheel systems may be grouped together (i.e., connected in series or parallel) to create a higher power output system. Such "flywheel farms" may have grid-level applications and could provide backup power for higher power uses, such as for factories, large offices, neighborhoods, or even cities if the flywheel farm is large enough. The amount of power that may be stored will depend on the number of flywheel systems in the flywheel farm, as well as the power storage and output capabilities of individual systems.

One such "flywheel farm" implementation is Community Energy Storage ("CES"). The maximum benefit of CES is at locations at or near the edge of the grid, which may serve a group of homes, for example. However, embodiments of the present invention may be implemented at any desired level and are not limited to CES. The local benefits of CES include renewable integration, backup power, and voltage correction. The grid benefits include load leveling at substations, power factor correction, and ancillary services.

The flywheel system of some embodiments may include an advanced touchdown bearing design. In addition, advanced rotor, motor/generator ("MG"), housing, software, power electronics, and control designs may also be included in some embodiments. An advantage of using a MG over just a motor is that a motor only provides rotation, whereas the MG can convert electrical power into rotation (i.e., motor functionality) or convert mechanical rotation of the rotor from an external source, such as a central rotor, into electrical energy (i.e., generator functionality). For practical flywheel systems, both motoring and generation are needed. These features combine to provide a flywheel with a higher energy density for grid storage applications than conventional systems. An all-steel rotor may be used to further lower costs, although any suitable material may be used.

Bearingless MGs levitate and spin the rotor (i.e., the rotating portion) of the MG on a magnetic field, without the use of traditional mechanical bearings (e.g., ball bearings or magnetic bearings). Thus, bearingless MGs combine the functions of magnetic bearings and a motor/generator. In flywheel applications using bearingless MGs, the central rotor (rotating portion, or flywheel) is levitated and spun on a magnetic field. A bearingless MG, or a set of bearingless MGs, levitate and rotate the central rotor using combined actuators. This is a complex problem since the actuator should be designed to work in tandem with the control system, power electronics, sensors, and other systems to provide levitation and spinning of the rotor without physical contact.

In practice, some systems separate motor coils into pole-pairs, which are each driven separately. This may allow the generation of six radial force vectors that are used to levitate the rotor. However, these approaches leave some gaps in the spatial MMF generation, resulting in generated levitation forces that are not symmetrical.

In some embodiments, smoother force generation over conventional systems may be provided that allows for improved fidelity in the generation of arbitrary MMF waves. This can be implemented using two approaches: an improved pole-pair reference frame approach and a separate pole approach. The improved pole-pair reference frame approach provides a new reference frame that takes advantage of improved combinations of motor spatial phases. The separate pole approach further subdivides motor phases into single poles, and may optimally combine these MMFs such that even greater fidelity force commands can be generated.

In order for the bearingless MG control system to operate, information on the position of the rotor in space (i.e., x, y, and z direction) and the rotational angle of the rotor is gathered and fed back to the controller. Since the rotor is levitated during operation, this position and angle information is gathered without any contact with the rotor. In conventional systems, separate sensor subsystems are used to gather position data and angle data. Position data for levitated rotors (e.g., in magnetic bearings) has been gathered using non-contact sensors, for example, eddy current sensors, reluctance sensors, or capacitive sensors. Rotation angle for existing motor/generators is often measured using encoders or resolvers. Separate techniques have been described for sensorless rotor position sensing, and rotor angle measurement, but no combined measurement is known.

Certain embodiments are able to sense rotation and position information for bearingless MGs without using separate sensors. Such embodiments may provide improved data quality (e.g., minimum noise, minimum error) at a lower cost and higher reliability. Additionally, mass and volume may be minimized, which is desirable in many systems. Control of bearingless MGs requires accurate, non-noisy information of both the position of the rotor in space and the angle of the rotor's rotation, without physical contact with the levitated rotor. Magnetic bearing systems require position information to levitate the rotor, and MGs in many applications require rotor angle information. In the case of the bearingless MG, all information on the rotor position as well as the rotor angle must be provided, without any direct contact with the rotor. This is a complex problem, because lateral movement of the rotor, which is allowed in bearingless systems, will change the measured angular estimate, and vice versa. Care should be taken to correctly estimate all position information and the angular data.

There are a number of disadvantages to using sensors to gather position and angle data. Sensor systems require additional parts to be added to the flywheel system, which will increase overall flywheel system cost, introduce more potential malfunctions, decrease system reliability, and increase system volume and mass. These sensors can also pick up noise, which hinders control. The noise may come from other electromagnetic systems (such as the MG, power electronics, or magnetic bearings), as well as cross-talk noise from other nearby sensors. Conventional attempts to eliminate this noise generally require additional hardware, complexity, and cost. Resolvers and encoders, which are sensors used to provide angle feedback, also have a number of disadvantages. Acquiring the angle information with correct resolution and sufficient accuracy can be difficult, especially at higher speeds. Mechanical difficulties can prevent high speed operation, and these sensor types are also susceptible to noise, possibly from the MG itself. The sensorless approach of some embodiments has the advantage of reducing the complexity of the system by eliminating hardware components and their associated failure modes, volume, and mass.

Cylindrical Flywheel System

FIG. 1 illustrates a perspective cutaway view of a cylindrical flywheel system 100, according to an embodiment of the present invention. However, embodiments of the present invention are not limited to cylindrical implementations. A vacuum cylinder 110 houses a central rotor 120 in an air-free environment. In some embodiments, central rotor 120 may weigh approximately 15,000 pounds and have the capability to provide ~108 kW-h of energy when spun up to sufficient speed. Central rotor 120 stores rotational kinetic energy when rotation is speeding up and supplies energy when central rotor 120 slows down. An upper motor 130 and a lower motor 140 are positioned above and below central rotor 120, respectively. Upper motor 130 and lower motor 140 drive the rotation of central rotor 120, as well as radially levitate central rotor 120 using magnetic force. An axial magnetic bearing 170 is used to levitate the rotor axially. In some embodiments, upper motor 130 and lower motor 140 may be MGs. Upper mechanical touchdown ("TD") bearings 150 and lower mechanical touchdown bearings 160 provide support for central rotor 120 when cylindrical flywheel system 100 is not powered or during a failure of the levitation system.

In certain embodiments, different numbers of MGs may be used. For instance, one or more than two MGs may be used, depending on the design. In certain situations, it may be advantageous to use more than two MGs. For instance, when the rotor is heavy, control of bending modes/damping is desired, and/or more torque is desired, adding additional MGs may be particularly beneficial.

In certain embodiments, the rotor may not be vertical. For instance, the rotor may be horizontal or at an angle. However, care should be taken to provide enough lift in such configurations.

Figure 2:
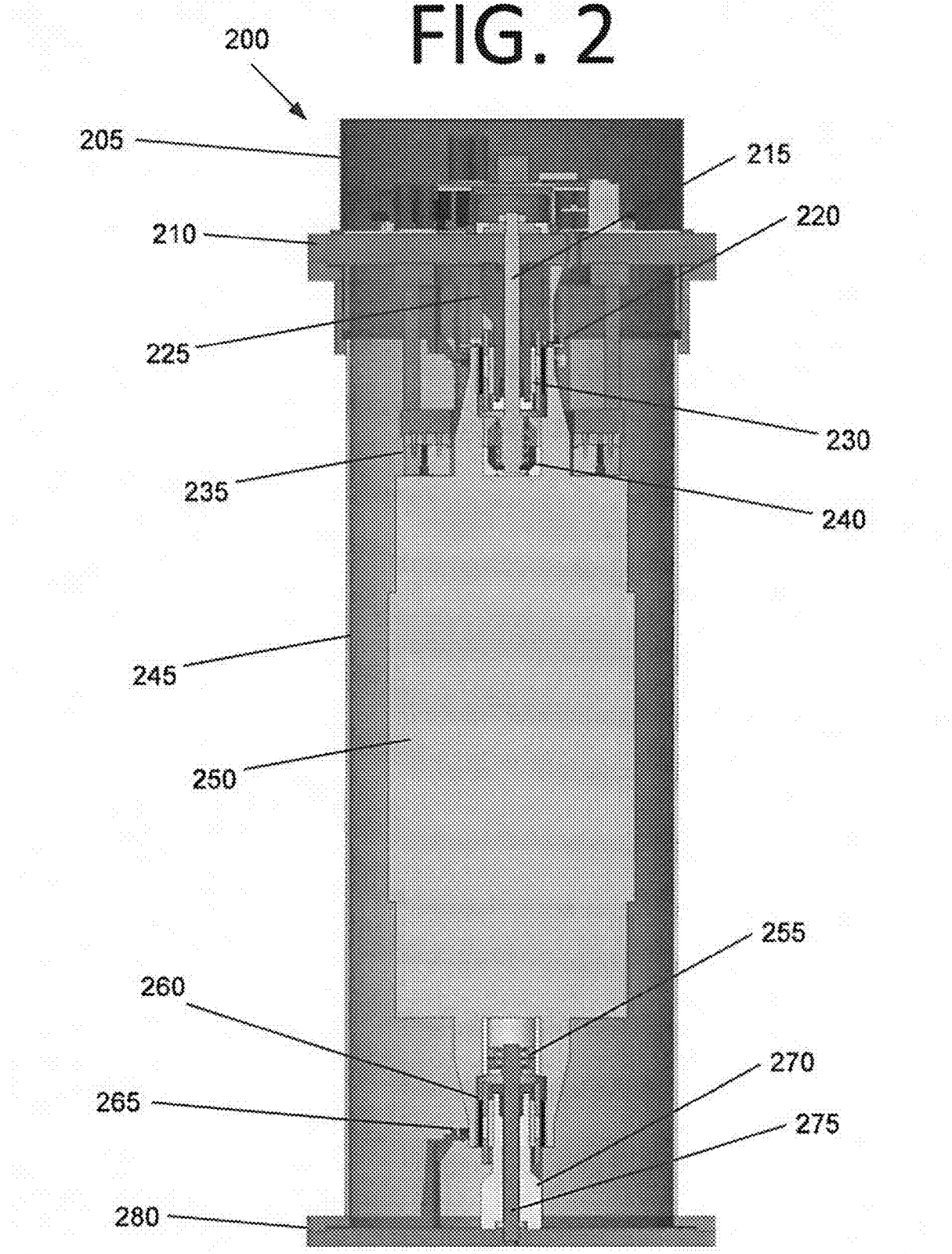
FIG. 2 illustrates a side view of a cylindrical flywheel system, according to an embodiment of the present invention.

FIG. 2 illustrates a side view of a cylindrical flywheel system 200, according to an embodiment of the present invention. In some embodiments, cylindrical flywheel system 200 may be the same as cylindrical flywheel system 100 of FIG. 1. Cylindrical flywheel system 200 includes an electronics box 205 containing control electronics that is positioned above a sealed upper cap 210. In some embodiments, the electronics may be external to cylindrical flywheel system 200, or placed in another location within or around the system. Sealed upper cap 210 and sealed lower cap 280 create an airtight seal for vacuum cylinder 245.

In this embodiment, software stored on controllers in electronics box 205 controls upper motor 230 and lower motor 260. In some embodiments, the controller may be control system 2400 of FIG. 24. The software may exist as modules in control system 2400, for example. The software may provide supervisory functions to the overall operations of cylindrical flywheel system 200. The software may control the outer loop (DC bus and force, torque, and speed ("DC-FTS") controller) or the inner loop (motor current controllers and axial magnetic bearing ("AMB") controller). The DC-FTS controller converts input sensor data into current control signals to rotate and spin motors 230 and 260. The motor current controller includes control loops that control current in motors 230 and 260. The AMB controller controls axial levitation of AMB 235. This control loop is generally separate from radial levitation control loops.

An upper shaft 215 extends from sealed upper cap 210 through upper motor support 225 and upper motor 230 into upper TD bearings 240. Upper shaft 215 has a low radial stiffness and high axial stiffness, and provides a thermal path for heat transfer. Upper motor support 225 has high stiffness.

Upper TD bearings 240 have the capacity to carry axial and radial loads in this embodiment. Mechanical TD bearings 240 support central rotor 250 when cylindrical flywheel system 200 is not powered or during a failure of the levitation system. Upper motor 230 is a rotor/stator and radially levitates and drives the rotation of central rotor 250, which is used to store energy rotationally. Axial sensors 220 are non-contact sensors that measure the axial position of central rotor 250. Axial sensors 220 provide position feedback to a control algorithm to levitate the rotor axially and to measure the angle to spin central rotor 250. AMB 235 provides magnetic levitation of central rotor 250 in the axial direction.

On the lower end of cylindrical flywheel system 200, a lower shaft 275 extends through lower motor support 270 and lower motor 260 into lower TD bearings 255. Lower TD bearings 255 have the capacity to carry radial loads in this embodiment. Lower motor 260 may be a rotor/stator that radially levitates and drives the rotation of central rotor 250, in concert with upper motor 230. Radial sensors 265 may be non-contact sensors that measure the position of central rotor 250 in the radial direction. In order to levitate the rotor of lower motor 260, and thus central rotor 250, the control algorithm may use radial sensors 265. Upper motor 230 and lower motor 260 may be custom bearingless MGs that both rotate central rotor 250 and provide radial direction suspension for central rotor 250 on a magnetic field.

FIG. 3 is a side view of an upper portion 300 of a cylindrical flywheel system, according to an embodiment of the present invention. In some embodiments, upper portion 300 may be part of cylindrical flywheel system 200 of FIG. 2. Upper portion 300 includes top bearingless MG rotor 360 and stator 365, AMB 380, and TD bearings 385.

Upper portion 300 includes an electronics box 305 containing control electronics that is positioned above a sealed upper cap 315. Sealed upper cap 315 is part of the vacuum housing that provides a vacuum environment for central rotor 397. Electronics box 305 contains control electronics that control the MG and interface with the grid. Electronics box 305 may include several feed-throughs that provide a path for electrical cables while maintaining a vacuum. A shaft sealed cap 320 caps the top of upper shaft 335 and provides a vacuum to the upper cap area. A shaft nut (retainer) 325 locks upper shaft 335 in place.

Upper shaft 335 supports TD bearings 385 and extends from sealed upper cap 315 through upper motor support 330 into TD bearings 385. In this embodiment, upper shaft 335 does not rotate. An upper motor support 330 holds a stator 365 of the upper motor in place. Rotor 360 levitates and rotates, levitating and rotating central rotor 397 as well. Stator 365 does not move in this embodiment, but provides magnetic fields for the levitation and rotation of rotor 360. Axial sensors 350 may be non-contact sensors that measure the axial position and angular position of central rotor 397. Axial sensors 350 may be used by the control algorithm to levitate rotor 360 axially and to spin rotor 360, and thus levitate and rotate central rotor 397. Radial sensors 355 may be non-contact sensors that measure the position of central rotor 397 in the radial direction. Radial sensors 355 may be used by the control algorithm to levitate central rotor 397. AMB bracket 340 holds AMB components in place. An upper cap pilot 345 aligns sealed upper cap 315 and a vacuum cylinder 399.

A shaft damper 370 provides damping between upper shaft 335 and upper motor support 330. Shaft damper 370 may be a mesh damper, and may be composed of copper, NiTi, or any other suitable material. A damper end cap 375 helps to hold shaft damper 370 in place and limits inner shaft deflection. Upper touchdown bearings 385 have the capacity to carry axial and radial loads in this embodiment. Upper TD bearings 385 support central rotor 397 when the power is off (i.e., the MG is not operating). TD bearings 385 may also allow rotation of central rotor 397 when magnetic levitation has failed. During normal operation, central rotor 397 generally does not contact TD bearings 385. A TD bearing clamshell 390 and a TD bearing rotor insert 395 limit the maximum axial and radial motion of central rotor 397 during normal operation.

FIG. 4 is a side view of a lower portion 400 of a cylindrical flywheel system, according to an embodiment of the present invention. In some embodiments, lower portion 400 may be part of cylindrical flywheel system 200 of FIG. 2. Lower portion 400 includes bottom bearingless MG rotor 430 and stator 435.

Lower portion 400 includes a TD bearing rotor insert 405 and a TD bearing clamshell 415 that limit the maximum radial motion of central rotor 455, but these are not engaged during normal operation. TD bearings 410 are typically ball bearings in races (holders) that allow central rotor 455 to turn when there is no power. A shaft damper 420 provides damping between lower shaft 425 and lower motor support 445.

A lower motor support 445 holds rotor 430 and stator 435 of the lower motor in place. Rotor 430 and stator 435 drive the rotation of, and radially levitate, central rotor 455. More specifically, stator 435 drives rotation and levitation of rotor 430, and thus central rotor 455. To levitate rotor 430, the control algorithm may use radial sensors 440. A lower cap pilot 450 aligns the lower cap with vacuum cylinder 460.

FIG. 5 is a side perspective view 500 of an AMB 510 that shows the location of AMB 510 on a central rotor 520, according to an embodiment of the present invention. AMB 510 is located at the top of central rotor 520, interacting with the upper shaft end of central rotor 520. In a sense, central rotor 520 "hangs" from AMB 510. In some embodiments, there may be a nominal gap of ≥0.020 inches. The nominal gap is more clearly illustrated in FIGS. 6A and 6B, for example. AMB 510 may have a permanent magnet bias so as to lift the weight of central rotor 520 near the nominal gap with little or no current. Current may be applied to AMB 510 to move central rotor 520 off of the touchdown bearings back to the center.

FIG. 6A illustrates a close-up side view 600 of an AMB 605, according to an embodiment of the present invention. AMB 605 includes a mounting ring 610, which is non-magnetic and holds AMB parts. AMB 605 also includes an inner pole 615 and an outer pole 620, both of which are magnetic and may be constructed from any suitable material, such as 4340 steel. Direct magnetic flux is used to levitate rotor 635.

A magnet ring 625 and a coil 630 are included between inner magnetic pole 615 and outer magnetic pole 620. Magnet ring 625 is a ring of permanent magnets that provide sufficient flux to lift rotor 635. Magnets of magnet ring 625 may be constructed from any suitable material, such as neodymium iron boron, and may include any desired number of individual magnets. In some embodiments, magnet ring 625 includes 69 individual magnets that are 0.75 inches thick radially, 1.00 inches thick circumferentially, and 2.50 inches long axially.

However, the flux from magnet ring 625 is generally not stable, and current in coil 630 is generally needed to control levitation. Coil 630 carries current that provides adjustable flux to control levitation. In some embodiments, coil 630 may be constructed from 16-gauge wire with 15 amps of maximum allowable current. Coil 630 may be 1.0×1.0 inches with a maximum current density of 2500 amps/in.$^2$ at 15 amps, and have 167 turns. A magnetic rotor 635 is positioned below AMB 605. Rotor 635 is the central rotor of the flywheel, and may be constructed from any suitable material, such as 15-5 PH stainless steel. Flux also flows through rotor 635 and levitates rotor 635.

FIG. 6B illustrates a side view of forces acting on the AMB of FIG. 6A, according to an embodiment of the present invention. Magnet ring 625 sets the nominal flux through inner pole 615 and outer pole 620, as well as through rotor 635. The force generated by this flux at a nominal gap 640 is equivalent to the weight of rotor 635. Nominal gap 640 runs horizontally, and is located between the flat portion of rotor 635 and the bottom sides of inner pole 615 and outer pole 620. Positive or negative current running through coil 620 increases or decreases both the flux and force, respectively.

Figure 7:
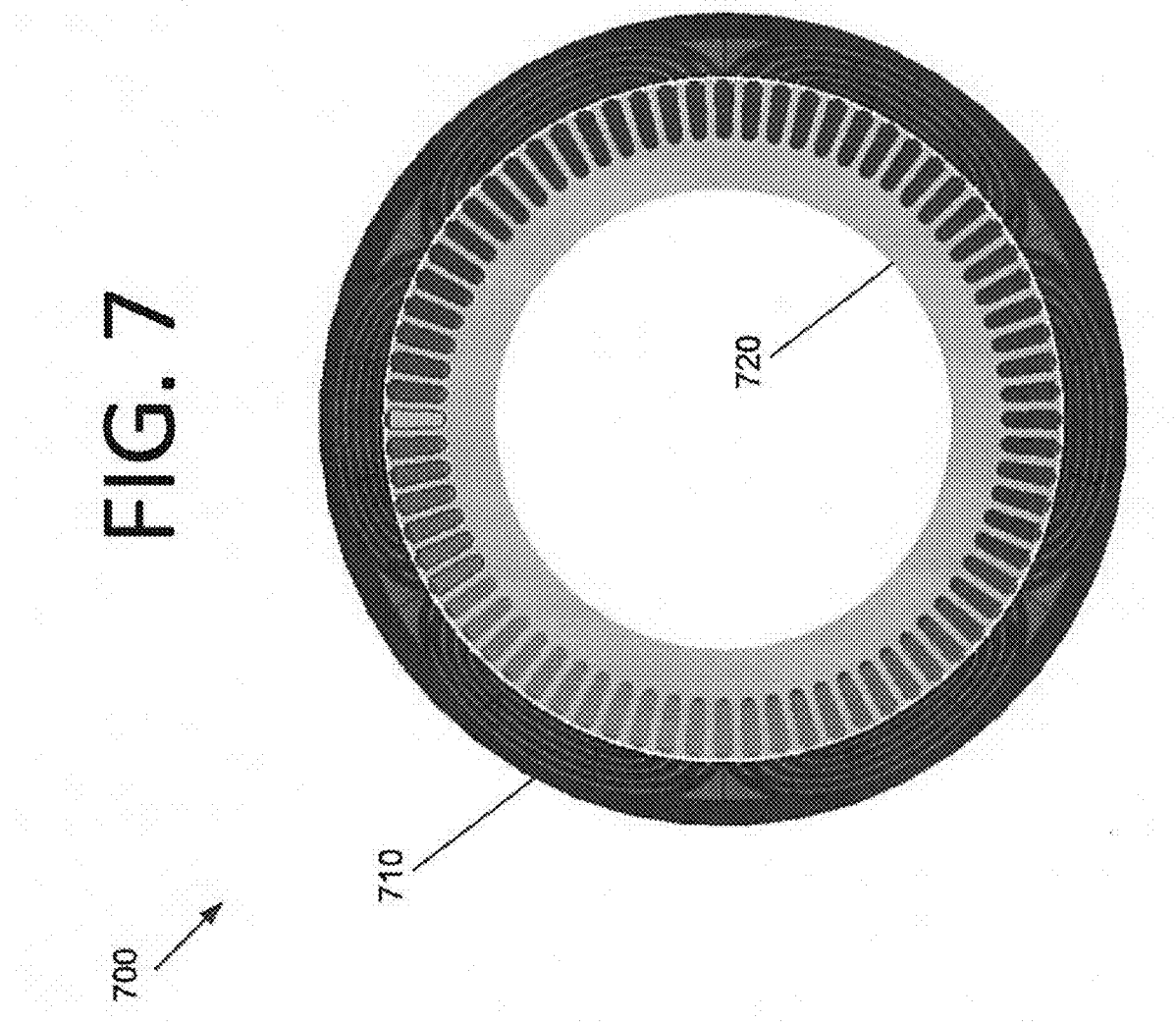
FIG. 7 illustrates a cross-sectional view of a cylindrical module bearingless motor/generator ("MG"), according to an embodiment of the present invention.

FIG. 7 illustrates a cross-sectional view of a cylindrical module bearingless MG 700, according to an embodiment of the present invention. Bearingless MG 700 includes a rotor 710, which surrounds a stator 720. Rotor 710 may have a solid design composed of high-strength steel, which may allow rotor 710 to levitate and rotate a central rotor that has a total kinetic energy of 104 kW-h and a normal operating speed of less than 12,000 rotations per minute ("rpms") in some embodiments. Bearingless MG 700 may be a synchronous reluctance bearingless motor.

In some embodiments, two bearingless MGs may be used in tandem. In certain embodiments, each bearingless MG may provide a maximum steady-state power of 31 kW across the operating speed range. Bearingless MG 700 is unusual in that it is an inside-out motor, meaning that rotor 710 (the portion that rotates) is on the outside, and stator 720 (the stationary portion) is on the inside.

Some embodiments may be capable of meeting performance requirements that are superior to conventional systems. For instance, some embodiments are able to operate very safely, with little or no risk of loss of life, injury, or property damage. The operating life of flywheel systems may exceed 15 years. Some flywheel systems may provide rated energy at rated power at the end of 1,000 cycles at a temperature of 25° C. Further, the service life may be greater than 1,000 startup/shutdown cycles.

Flywheel system storage life may be greater than five years, and the flywheel system may be designed to operate without scheduled maintenance for at least ten years. Some embodiments may be able to operate successfully without corrective maintenance for at least ten years. Also, some embodiments may be able to provide energy storage for a typical American suburb at a 25 kW/75 kW capacity level for clusters of 3 to 4 homes.

There is wide commercial potential for many embodiments of the present invention. For terrestrial implementations, significant benefits could be realized for future high energy, high speed flywheel systems. Entities that may benefit include energy companies and U.S. government agencies. On a commercial grid, flywheel systems could be used for CES. Furthermore, such systems could be used for forward bases and local bases for defense applications.

High Aspect Ratio ("HAR") Flywheel System

Some embodiments use a HAR design that may be less expensive while providing improved performance. The HAR design may be referred to as a disk design due to the relatively wide, flat shape of the rotor. Some of the improvements that may be realized by a HAR design include manufacturability improvement with respect to heat treatment, manufacturability/assembly improvements with respect to tolerance issues, a reduction in the overall parts count due to a pendulum configuration and passive AMBs.

Certain rotor designs, such as some cylindrical designs, have a practical diameter limit due to manufacturing issues. This is primarily because the heat treatment that is required to guarantee performance at speed generally cannot be provided beyond a certain size ingot of steel. Certain rotor shapes would exceed this practical limit for some intended designs, providing diminished performance (e.g., top rotor speed would be lowered). This problem could be overcome by using multiple units with smaller rotors in combination to meet required performance, but this approach would likely also increase cost. In order to develop a lower cost approach, a new rotor configuration that does not have heat treat limitation issues.

The HAR design avoids these heat treatment issues. With the HAR rotor, forgings can be made with a larger size, while still guaranteeing heat treatment quality. These rotors may only be 12 inches thick or less in some embodiments, and heat treatment can be performed at this thickness, unlike at thicker diameters used in some rotor designs.

The nature of some designs, such as certain cylindrical designs, is such that they require close tolerance control. For example, in some cylindrical designs, tolerances of 0.010" would need to be maintained over a ten foot length. This would drive up cost because design requirements would be exacting on the manufacturer, and assembly requirements would also be complex. Using a HAR design significantly reduces the tolerance requirements, thus significantly reducing the burden on manufacturing and assembly, and reducing cost considerably.

Figure 8:
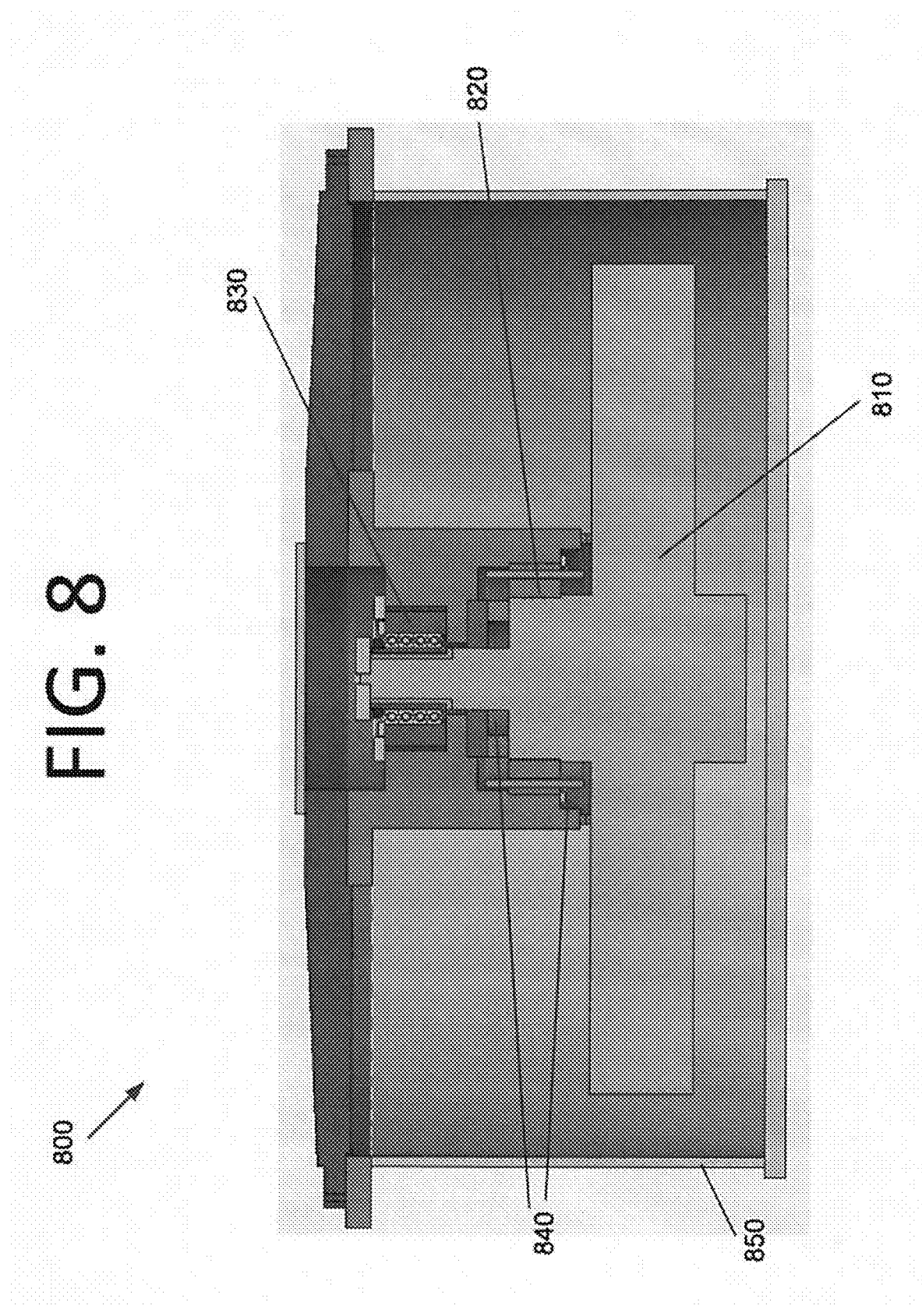
FIG. 8 illustrates a side view of a high aspect ratio ("HAR") flywheel system, according to an embodiment of the present invention.

Using a single bearingless motor and a single magnetic bearing, such as in HAR flywheel system 800 of FIG. 8, results in a "pendulum configuration", thusly named because the rotor in this case is not constrained at both ends, as it is in the cylindrical configuration of FIGS. 1 and 2, for example. Thus, HAR embodiments may be able to move like a pendulum. This configuration reduces the parts count by elimination of one BMG and one TD bearing, which will generally save cost and increase reliability.

Although an active MB may work for HAR designs, such a configuration also lends itself to use of a passive MB. This passive approach may further reduce initial cost due to elimination of active MB parts, and also provide a more efficient, lower power design. Additionally, a passive MB reduces the requirements on the TD bearing, thereby resulting in a lower cost TD bearing system as well. Such embodiments, the touchdown bearing may only need to support radial loads, not the mass of the rotor. Additionally, the TD bearing may only need to provide radial damping, rather than both radial and axial damping.

FIG. 8 illustrates a side view of a HAR flywheel system 800, according to an embodiment of the present invention. As can be seen in FIG. 8, HAR flywheel system 800 has a flat, wide HAR rotor 810, a single bearingless motor 820, a single touchdown bearing 830, MBs 840, and a vacuum housing 850.

Figure 9:
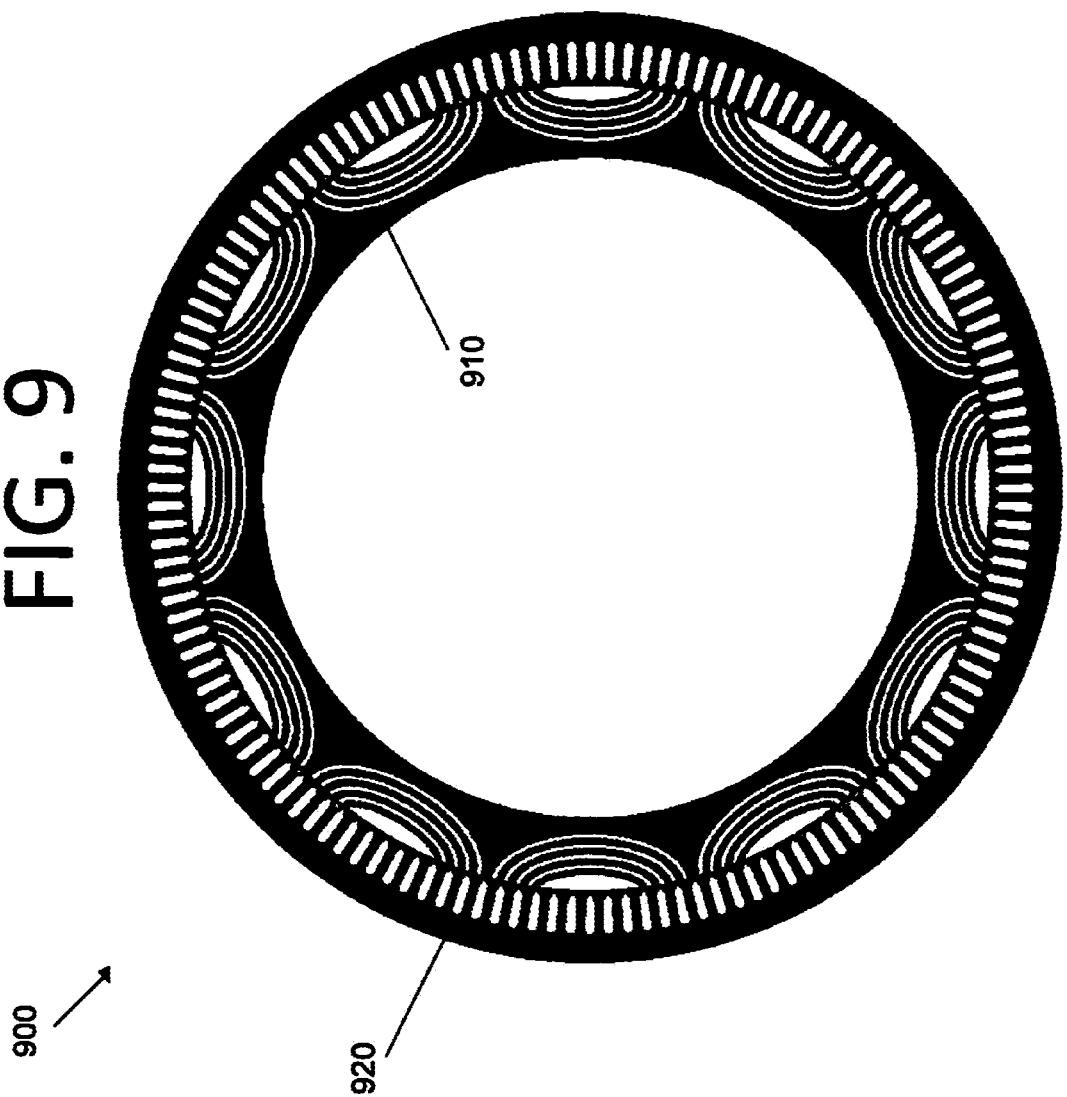
FIG. 9 illustrates a cross-sectional view of a HAR bearingless motor/generator ("MG"), according to an embodiment of the present invention.

FIG. 9 illustrates a cross-sectional view of a HAR BMG 900, according to an embodiment of the present invention. In some embodiments, HAR BMG 900 may be bearingless motor 820 of FIG. 8. HAR BMG 900 may be a synchronous reluctance BMG. However, HAR BMG 900 is different from the cylindrical implementation depicted in FIG. 7 since HAR BMG 900 is not inside-out. In other words, rotor (rotating portion) 910 is on the inside, and stator (stationary portion) 920 is on the outside.

Figure 10:
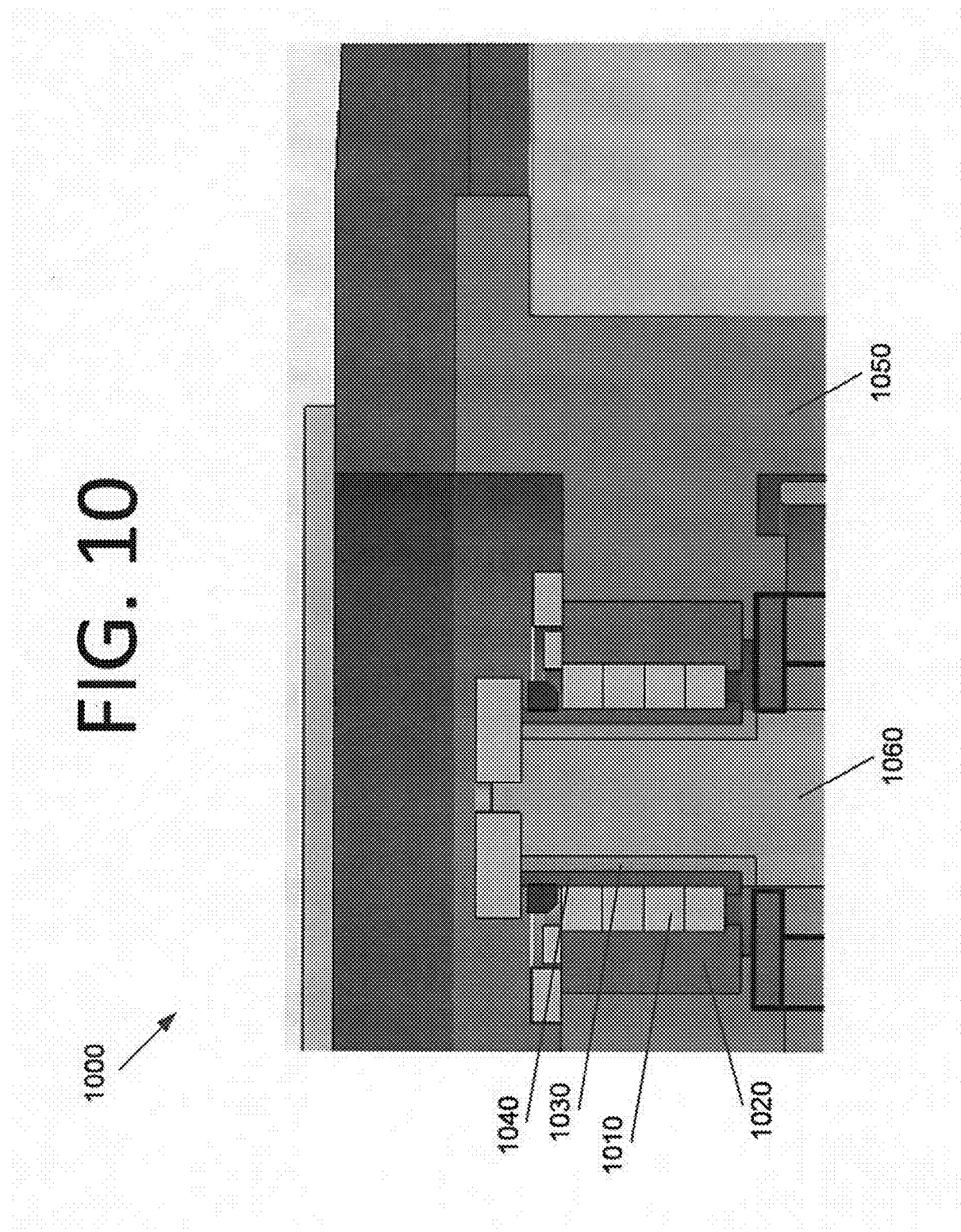
FIG. 10 illustrates a side view of an upper portion of a HAR, according to an embodiment of the present invention.

FIG. 10 illustrates a side view of an upper portion 1000 of a HAR, according to an embodiment of the present invention. Upper portion 1000 includes HAR TD bearings 1010. HAR TD bearings 1010 have a unique bearing, mount, and damper design configuration. The touchdown bearing system consists of three main components: bearings 1010, spring/damper mechanism 1020, and touchdown surfaces 1030 and 1040. Spring/damper mechanism 1020 is mounted in stator mount structure 1050. Spring/damper mechanism 1020 provides radial spring stiffness and damping to reduce the force on central rotor 1060 and displacement of central rotor 1060 during operation on HAR TD bearings 1010.

Spring/damper mechanism 1020 also provides a thermal path for bearing heat transfer. Stator mount structure 1050 has high stiffness. HAR TD bearings 1010 have the capacity to carry axial and radial loads in this embodiment. HAR TD bearings 1010 support central rotor 1060 when the unit is not powered or during a failure of the levitation system. In some embodiments, HAR TD bearings will be designed such that the rotor drop is stable (no whirl), the rotor displacements are low (no contact with the motor(s)), and the forces on HAR TD bearings 1010 are reasonable.

A wire mesh damper may be part of spring/damper 1020. Copper, stainless steel, or other suitable materials may be used. Spring/damper 1020 should minimize forces on central rotor 1060 while limiting the maximum displacement of central rotor 1060. The target for some embodiments was to find a spring/damper with a stiffness of 10,000 pounds per inch and damping of 100 lb-s/in. for low frequency modes.

Active MBs generally perform well. However, their use generally increases the parts count. This is because sensors, power electronics, controller analog-to-digital ("A/D") converters and digital-to-analog ("D/A") converters, and software are all generally needed to make active MBs work. At controller input, the analog signals from the sensors are converted using A/D converters to digital signals the controller can interpret. Conversely, the D/A converters convert the controller digital signal to analog to interface with the bearing power electronics. The A/D converters and D/A converters are resources that might not need to be provided, saving cost, reducing complexity, reducing possible failure modes, etc. Accordingly, some flywheel system embodiments use a passive MB design that lowers parts count and increases reliability.

Passive MB embodiments typically use permanent magnets ("PMs") instead of electromagnets. This simplifies the design and reduces the parts count. Since the PMs provide the flux without the need for electric current (unlike active MBs), this approach will also generally save power, making the system more efficient. The passive MB is generally separated into two sections—an attractive magnetic bearing and a repulsive magnetic bearing (see, for example, attractive magnetic bearing 1110 and repulsive magnetic bearing 1120 of FIG. 11).

Figure 11:
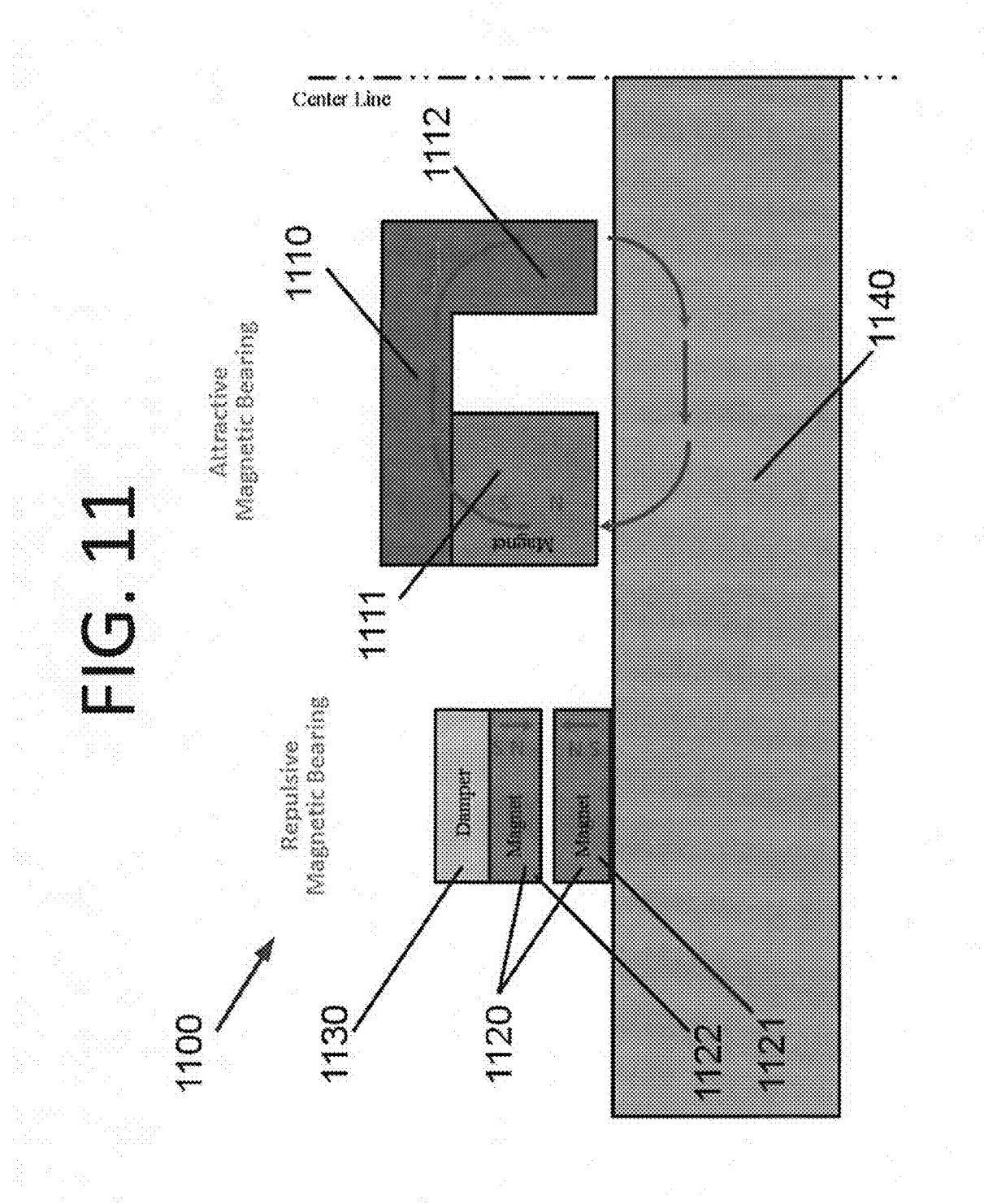
FIG. 11 illustrates a passive MB schematic, according to an embodiment of the present invention.

FIG. 11 illustrates a passive MB schematic, according to an embodiment of the present invention. Attractive magnetic bearing 1110 includes a permanent magnet ring 1111 and an iron flux path 1112, and attractive magnetic bearing 1110 interacts with central rotor 1140. Repulsive magnetic bearing 1120 includes two permanent magnet rings 1121 and 1122 oriented in an opposing configuration. Lower permanent magnet ring 1121 is mounted on central rotor 1140. Upper permanent magnet ring 1122 may be mounted in a damper structure 1130.

The combination of the forces and stiffnesses of attractive magnetic bearing 1110 and repulsive magnetic bearing 1120, and the weight of rotor 1140, create a passive axial levitation system in which an air gap is present between attractive magnetic bearing 1110 and central rotor 1140, as well as between magnetic rings 1121 and 1122. The components create a neutral point in space with zero net force that central rotor 1140 moves to when displaced. An axial restoring force is provided when central rotor 1140 moves away from the neutral point. Repulsive magnetic bearing 1120 may create a small radial destabilizing force that will be counteracted by the bearingless motor in some embodiments. Additionally, repulsive magnetic bearing 1120 provides a restoring torque to central rotor 1140 if the centerline is tilted through an angle like a pendulum. Magnetic ring 1122 of repulsive magnetic bearing 1120 may be mounted on mechanical damper 1130 that provides damping to reduce the amplitude of any tilting motion mentioned above.

Winding and Control Schemes

In bearingless MGs such as those discussed above, the rotor is completely levitated and spun on a magnetic field. It is generally desirable to use schemes for winding and controlling bearingless MGs that provide force generation that is as smooth as possible. Some embodiments employ an improved pole-pair reference frame approach or a separate pole approach.

Figure 12:
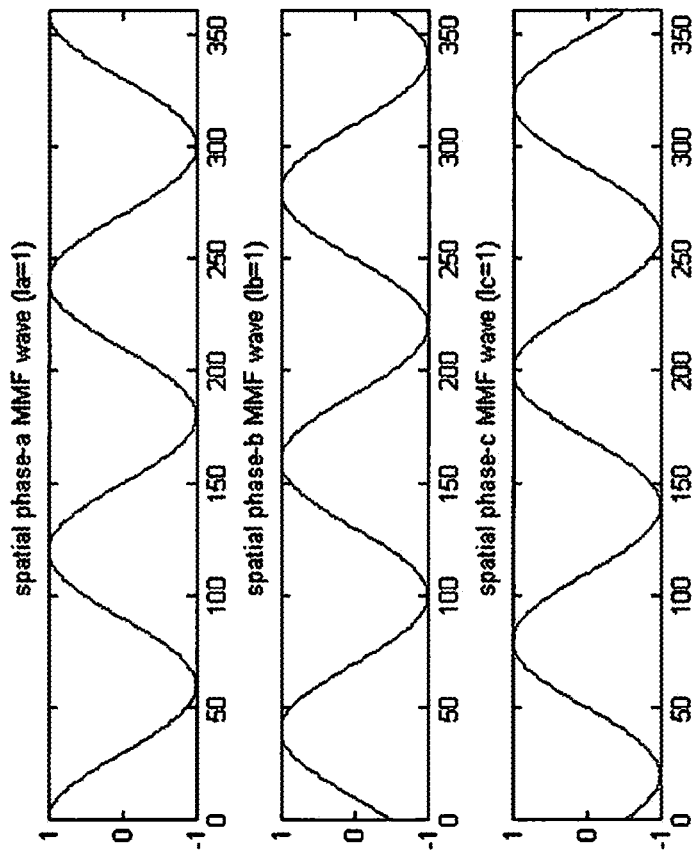
FIG. 12 illustrates graphs of the spatial magnetomotive force ("MMF") generated in a standard motor using traditional windings.

The improved pole-pair reference frame approach provides a new reference frame that takes advantage of improved combinations of motor spatial phases. The performance improvements provided by some embodiments may be explained in terms of generated spatial MMFs. Graphs 1200 of the spatial MMF generated in a standard motor, using traditional windings, are shown in FIG. 12. In this case, Ia, Ib, and Ic are set to 1 amp (and, for simplicity, the total equivalent turns is also 1). The resulting MMF is plotted versus mechanical angle.

Note that in the standard motor, there is no net MMF. In other words, all three MMFs cancel each other out, leaving no net force. This is of no use in levitating the rotor. In order to generate a net levitation force, the motor coils should be separated.

Figure 13:
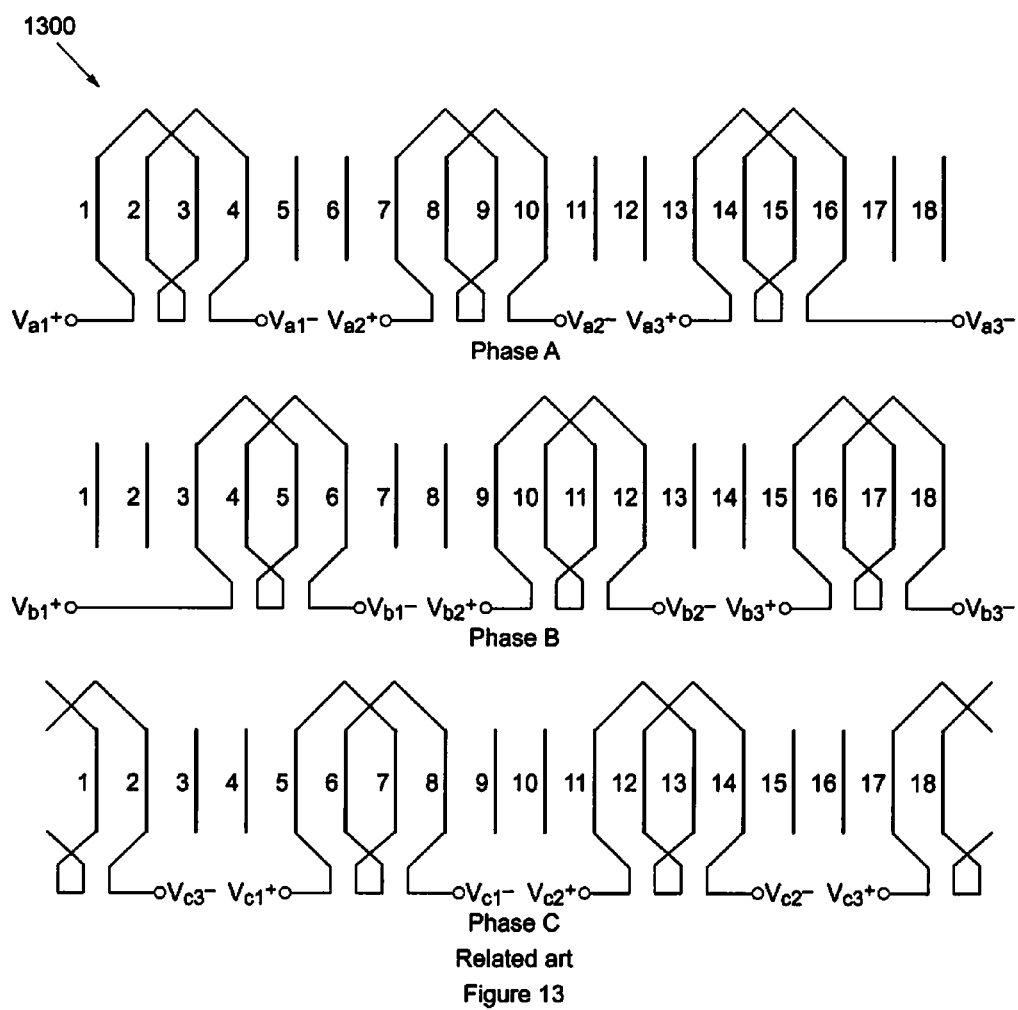
FIG. 13 illustrates a previous winding scheme for a bearingless MG.
Figure 14:
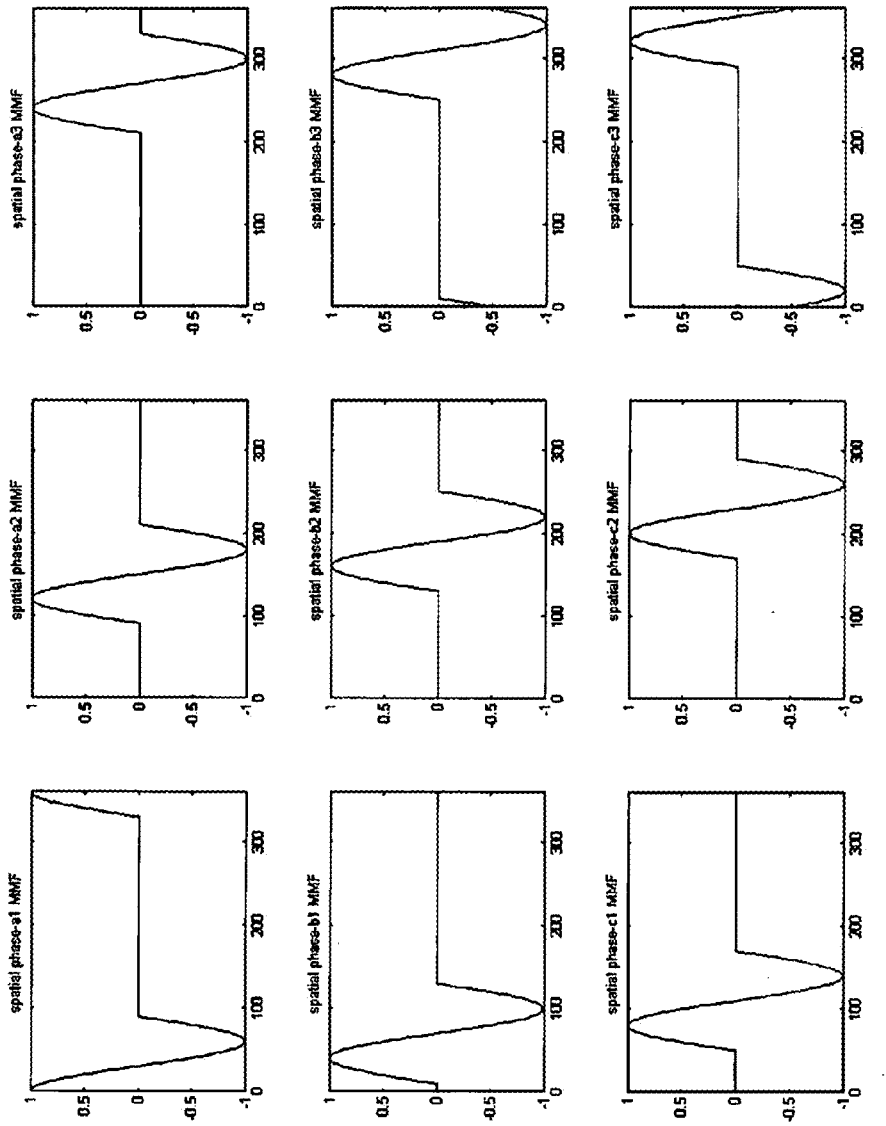
FIG. 14 illustrates graphs of spatial MMFs generated by a previous bearingless MG.

In some bearingless MGs, the pole pairs are driven separately. FIG. 13 illustrates a previous winding scheme 1300 for a bearingless MG. Graphs 1400 of the spatial MMFs generated in a bearingless MG are shown in FIG. 14. Note that these MMFs can be arbitrarily controlled. This allows generation of an imbalanced MMF, and thus creation of radial levitation forces.

It is possible to make improvements over existing bearingless MGs without making motor winding changes. Note that in previous systems, a1, b1, and c1 are controlled together, and likewise a2-c2 are controlled together and a3-c3 are controlled together. This approach groups the force by motor phases (stator windings). Thus, the control is linked to the stator, not the rotor. However, this leaves some gaps in the spatial force generation capability.

Figure 15:
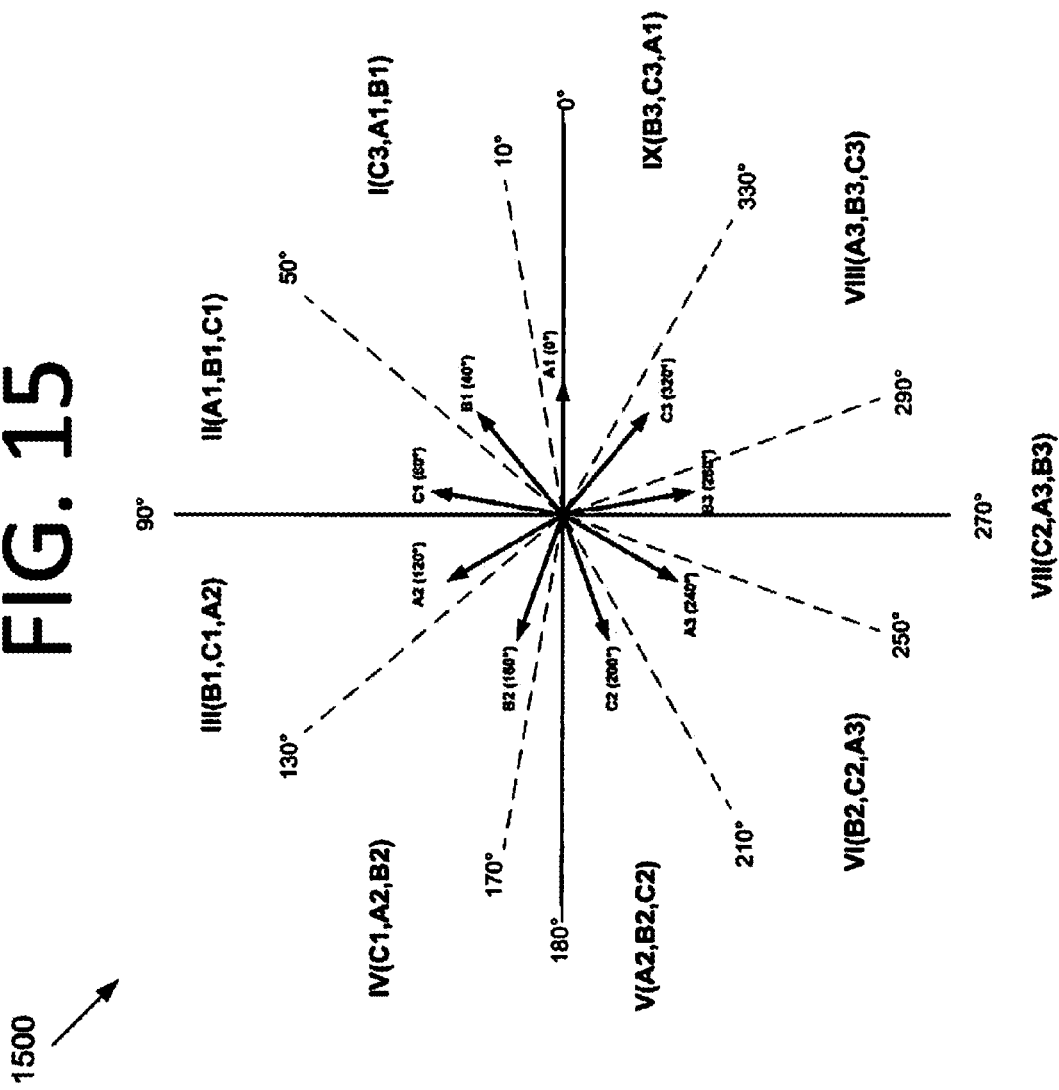
FIG. 15 illustrates an improved pole-pair reference frame, according to an embodiment of the present invention.

These gaps can be seen by interpreting graphs 1500 of FIG. 15. For example, in attempting to control force over the 10 to 50 degree region using the previous scheme, spatial phase a1-c1 is used, although c1 has no MMF generated over that region. Note, however, that another spatial phase, c3, does generate MMF over that region. There are nine such 40 degree bands spanning the 360 mechanical degrees of rotor travel, and in six of these bands, a better combination of spatial phases (combinations allowing better force generation capability) is available.

Some embodiments of the present invention create a new pole-pair reference frame to take advantage of these improved spatial phase combinations. This improved pole-pair reference frame 1500 is shown in FIG. 15. For example, at band I, C3, A1, B1 are used instead of A1, B1, and C1. Per the above, C1 does not generate force over this region.

Use of the new reference frame on existing controller and motor hardware is possible. This improved pole-pair reference frame allows higher fidelity in generating arbitrary MMF waves, which will allow smoother, more constant, more evenly spaced force generation.

Figure 16:
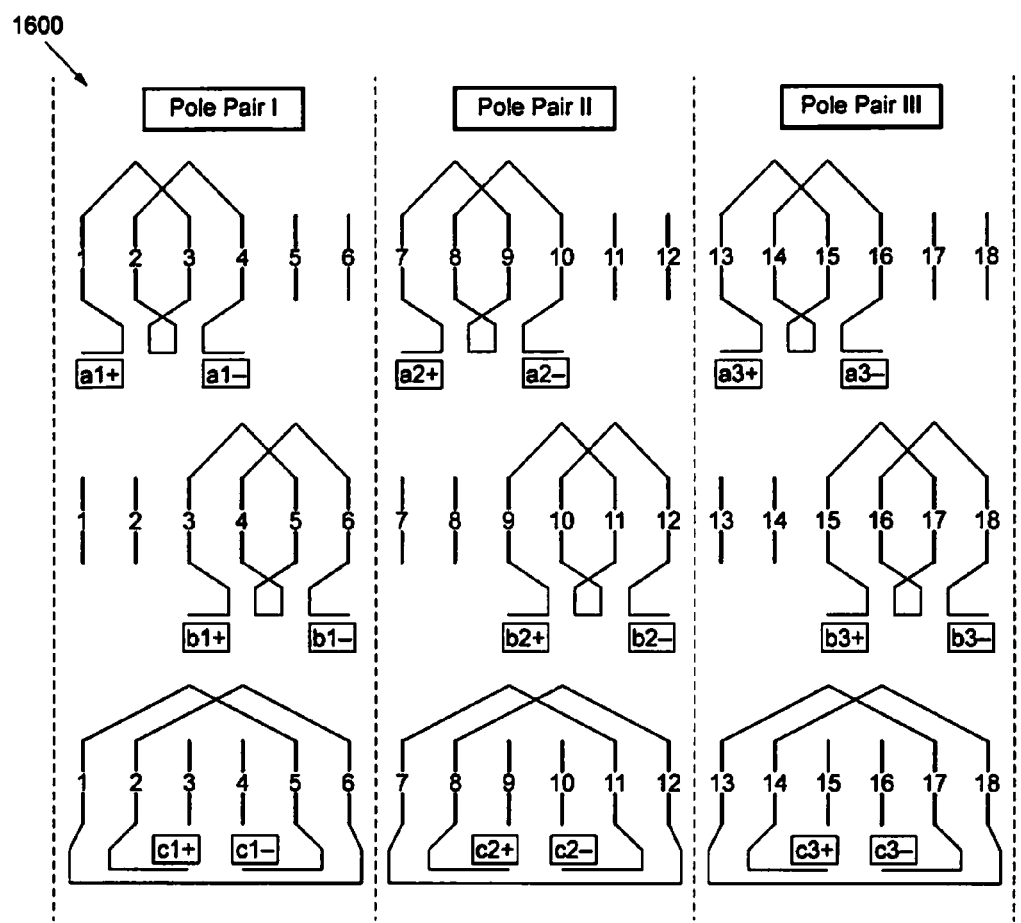
FIG. 16 illustrates a winding improvement for the improved pole-pair reference frame scheme, according to an embodiment of the present invention.

One possible winding improvement 1600 for the improved pole-pair reference frame scheme is shown in FIG. 16. FIG. 16 shows a winding scheme in which the influence of the three phases of a pole pair group (a1,b1,c1, or a2,b2,c2, or a3,b3,c3) extends exclusively to the same 120 mechanical degree span of the stator, where these 120 mechanical degree spans are indicated by the vertical dashed lines in FIG. 16. For example, when the stator is wound using the previous bearingless method of FIG. 13, c3 will extend into the pole-pair I region (a1, b1, c1) and c1 will extend into the pole-pair II region (a2, b2, c2).

A further improvement is possible using the separate pole approach mentioned earlier. The separate pole approach further subdivides motor phases into single poles and optimally combines these MMFs such that even greater fidelity force commands can be generated. In other words, the pole-pairs are further divided into separate poles, making even finer fidelity possible. Two example implementations of this winding scheme are shown in FIGS. 17 and 18.

Figure 17:
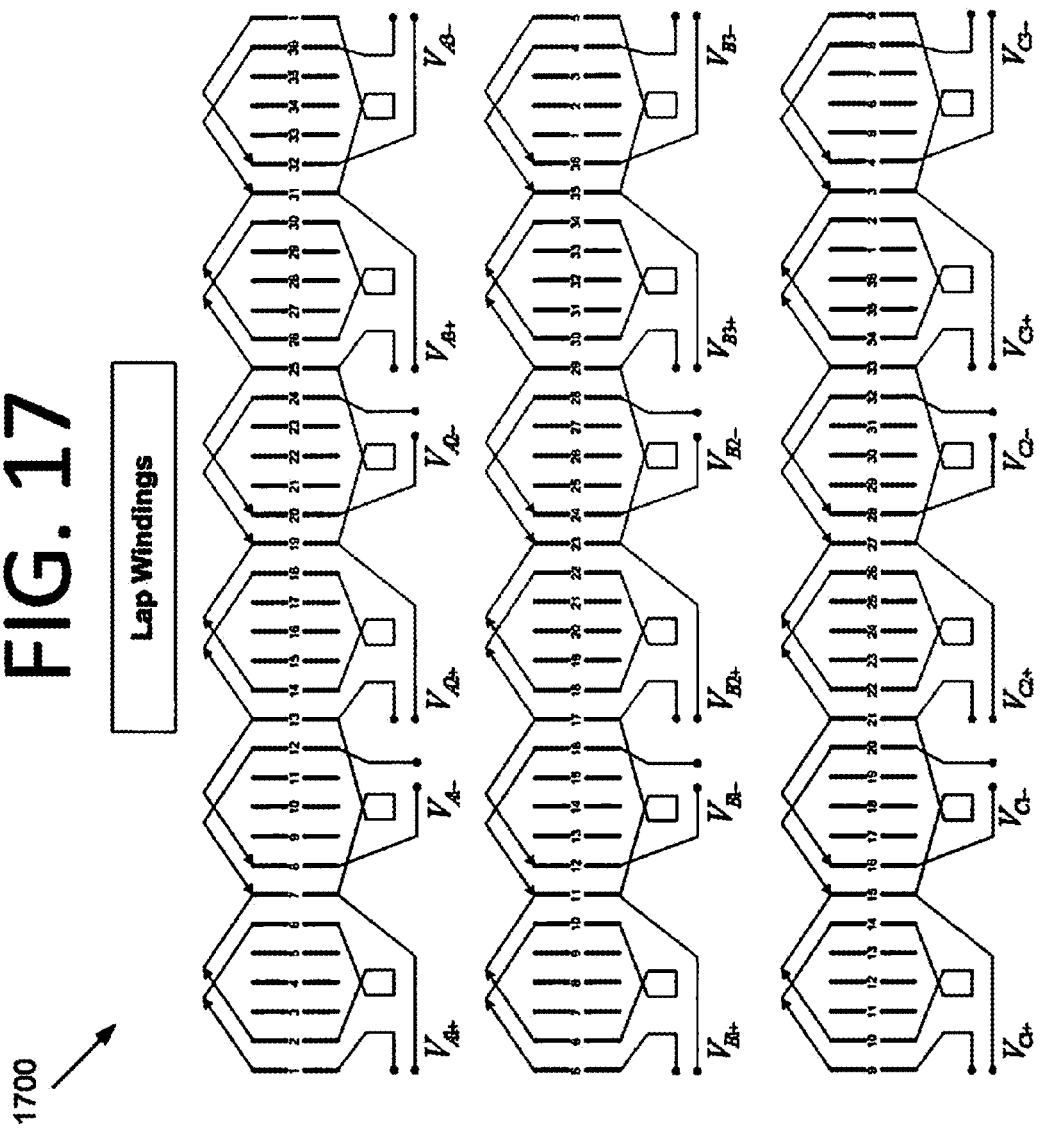
FIG. 17 illustrates a lap winding scheme, according to an embodiment of the present invention.
Figure 18:
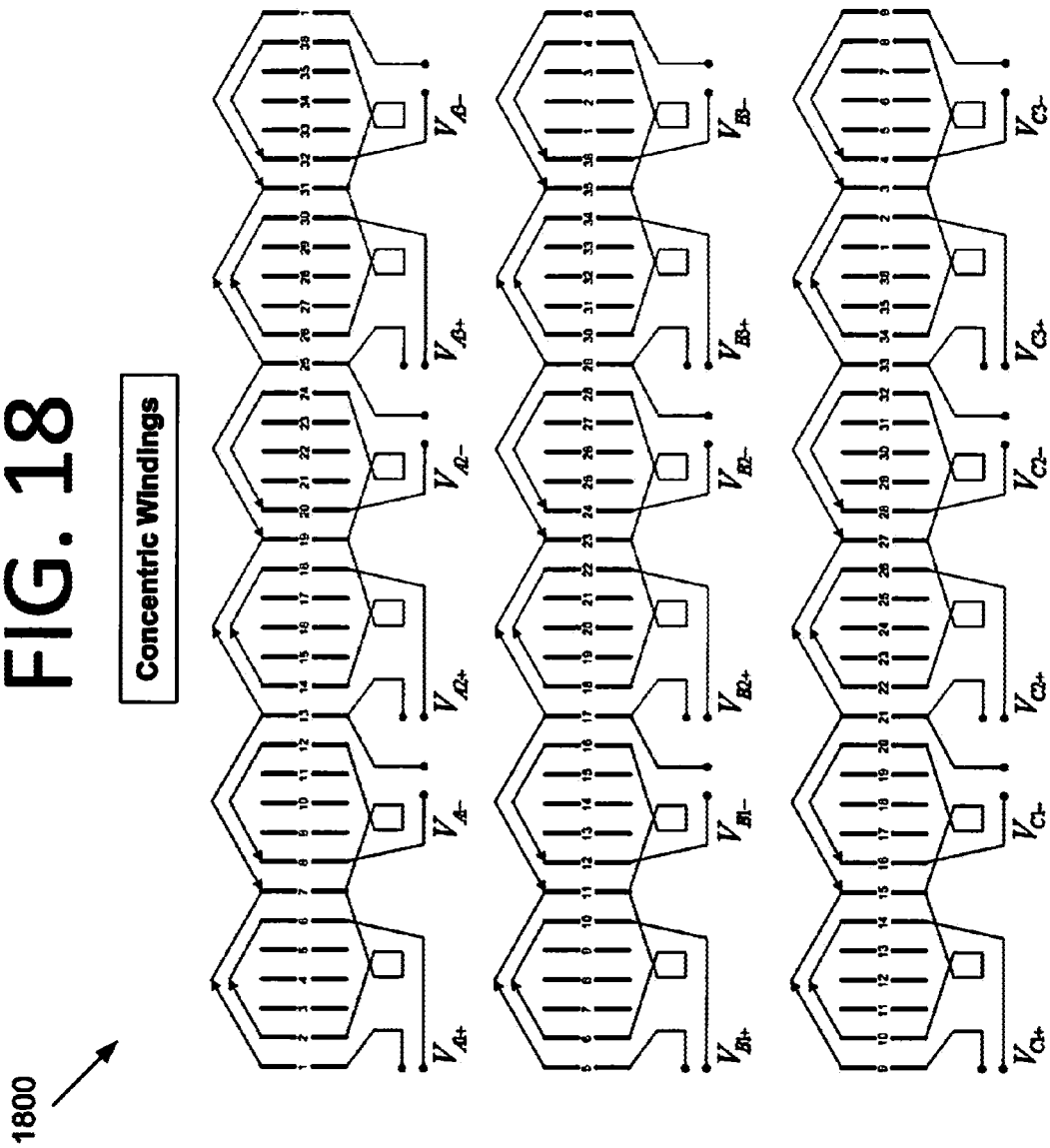
FIG. 18 illustrates a concentric winding scheme, according to an embodiment of the present invention.

FIG. 17 illustrates a lap winding scheme 1700, according to an embodiment of the present invention. More specifically, FIG. 17 shows a winding diagram implementing separate poles using a double layer lap wound scheme. FIG. 18 illustrates a concentric winding scheme 1800, according to an embodiment of the present invention. More specifically, FIG. 18 shows a winding diagram implementing separate poles using a concentric winding scheme. Either concentric or lap winding schemes may be chosen, depending on the application.

Figure 19:
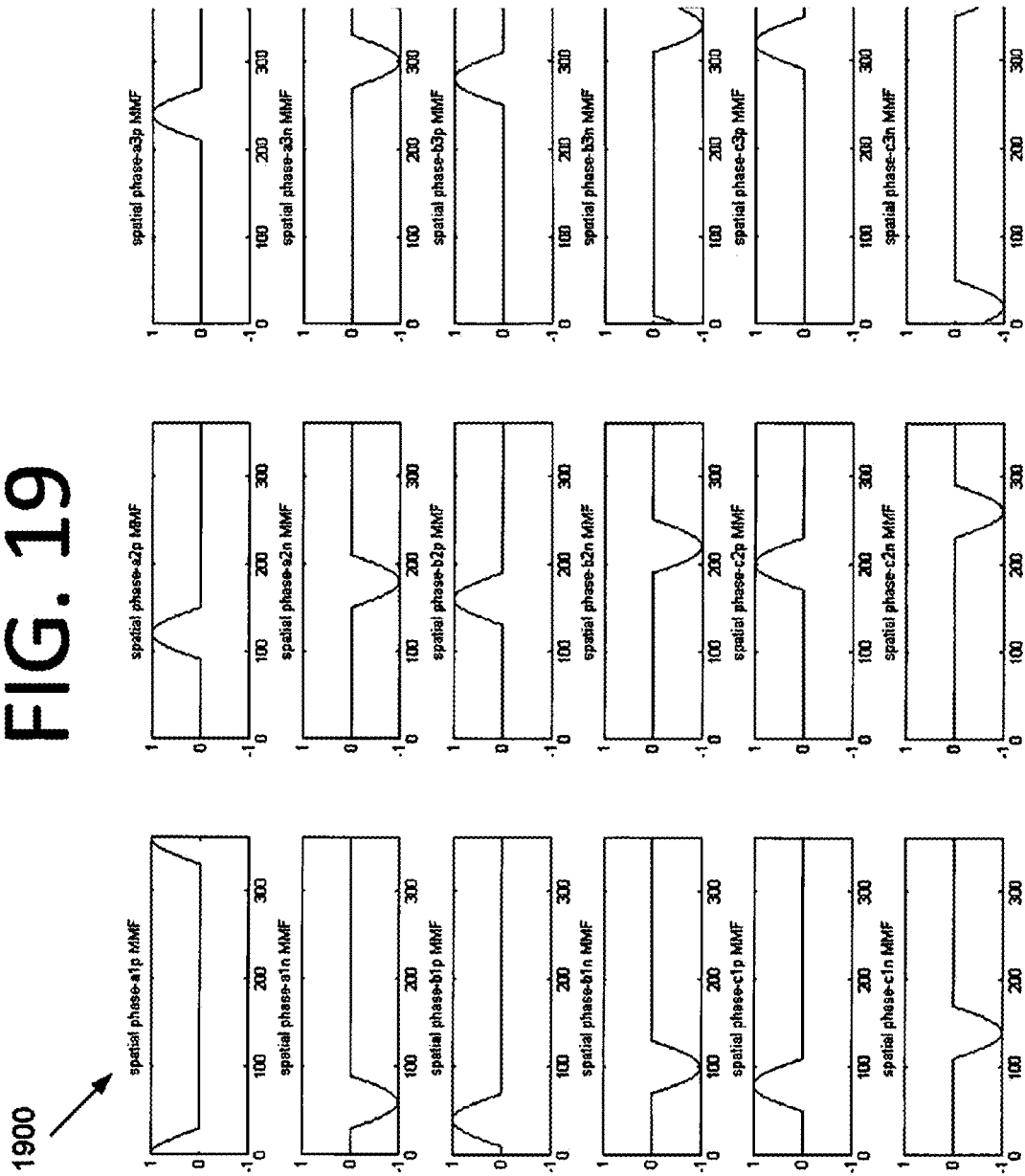
FIG. 19 illustrates 18 possible spatial MMFs generated by a separate pole approach, according to an embodiment of the present invention.
Figure 20:
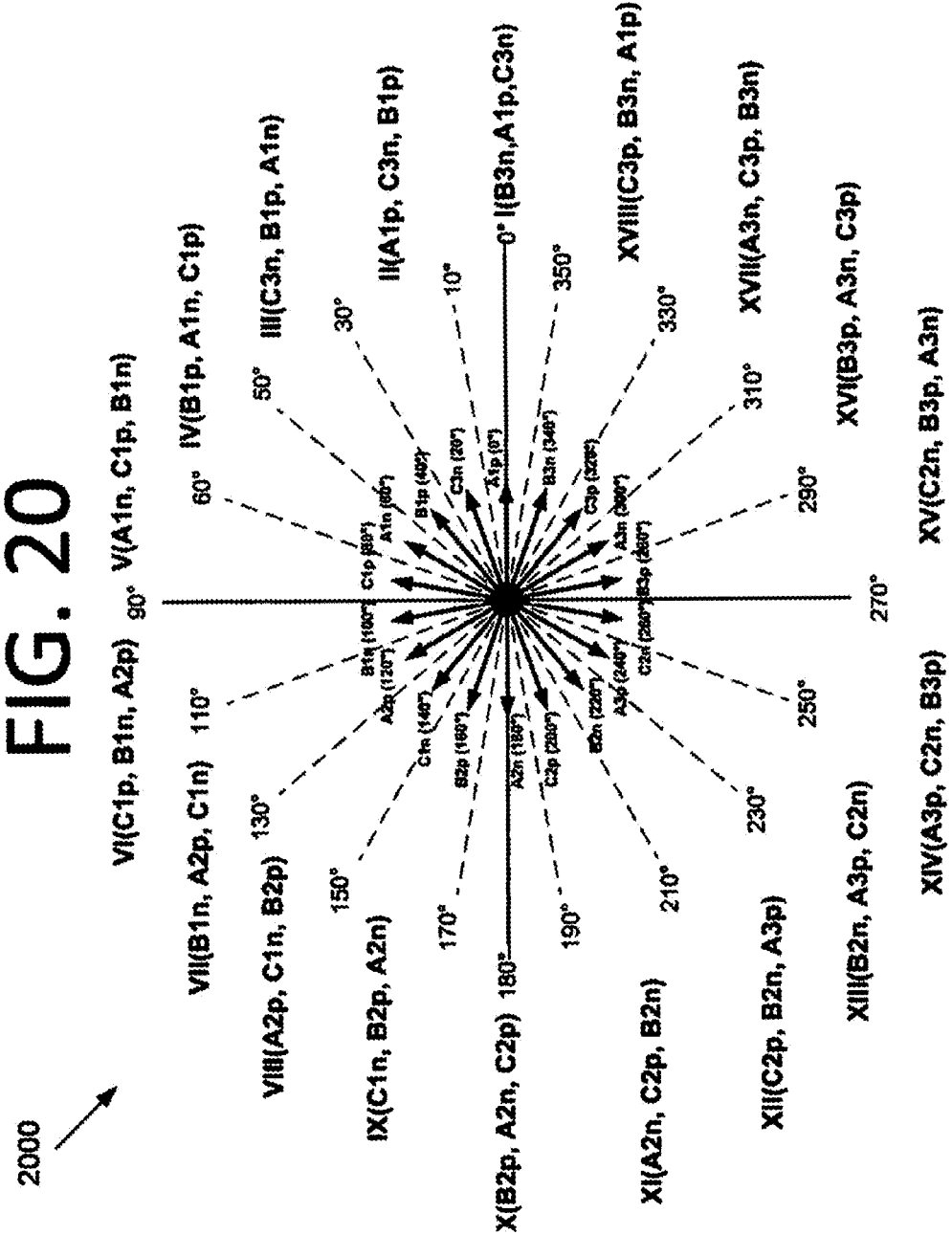
FIG. 20 illustrates a possible reference frame configuration for the separate pole approach, according to an embodiment of the present invention.

With separated poles, each pole being driven separately, 18 possible spatial MMFs are generated. These possible spatial MMFs 1900 are shown in FIG. 19. By optimally combining these spatial MMFs, even greater fidelity force commands can be generated. A possible reference frame configuration 2000 for this separate pole approach is shown in FIG. 20. In FIG. 20, "p" denotes a positive pole and "n" denotes a negative pole.

Because the separate pole approach allows individual poles to be driven, extended direct control of rotor flux is possible. This provides an opportunity to generate control forces for an even smoother force generation. Note that twice the number of switches is generally needed in the separate pole approach. However, each switch will typically need a lower power rating, which may actually provide a benefit in large systems by eliminating the need for paralleling switches. Note that both the improved pole-pair reference frame approach and the separate pole approach can be applied to spinning and/or levitation.

In some implementations of the separate pole reference frame, control software may allow the q and d axis currents, which are aligned to each motor pole, to be specified. This freedom allows the creation of an arbitrary lateral force, torque, and motor flux regardless of the motor technology. This is well suited for PM motors, induction motors, and synchronous reluctance machines because they are brushless and AC wound machines.

Sensorless Control

The sensorless control approach in some embodiments involves acquiring the desired rotor information, which is normally obtained with sensors (i.e., rotor position in space and rotor rotational angle), by extracting the values from electrical quantities that are available at the machine terminals (i.e., voltage and current). While sensorless techniques do exist, conventional techniques allow sensing of either position or angle, but not both. Some embodiments of the present invention are able to sense both position and angle data without the use of sensors. In other words, some embodiments are able to provide a combined sensorless solution that measures both levitated shaft position and rotation angle. In conventional systems, position and angle data is generally gathered by separate sensor subsystems.

Effective replacement of sensors generally requires determination of the lateral position and the angle of the rotor. Some embodiments make use of one or more of three separate methods for sensorless determination of these signals: (1) the high speed rotating voltage vector injection method; (2) the flux observation by back-emf integration method; and (3) the novel reference frame application method.

High Speed Rotating Voltage Vector Injection Method

In the high speed rotating voltage vector injection method, an identical rotating voltage vector is first applied to each pole or pole-pair in the bearingless MG. The bearingless MG rotor angle is then determined by summing all of the measured qualities of the pole or pole-pair windings associated with a particular phase. In the case of a bearingless MG with individual pole-pairs, the sums would be Ia=Ia1+Ia2+Ia3, and Ib and Ic would be similarly calculated. In the case of a bearingless MG wound with individual poles, the sums used would be Ia=Ia1$p$+Ia1$n$+Ia2$p$+Ia2$n$+Ia3$p$+Ia3$n$, and Ib and Ic would be similarly calculated.

These signals would then include the stator current vector that is used as the input to the signal processing, which is discussed below.

Consider the standard motor, with P pole-pairs connected in series or parallel and a rotor perfectly centered to the stator. In this embodiment, the motor has three phases. These phases are wound to produce three sinusoidal WIMP waves, spatially separated by 120 degrees.

The following rotating voltage vector is added to the field oriented control ("FOC") or direct torque control ("DTC") commands to the inverter to act as a carrier signal:

$$V_{\alpha\beta_c} = \begin{bmatrix} V_{\alpha_c} \\ V_{\beta_c} \end{bmatrix} V_c \begin{bmatrix} \cos\omega_c t \\ -\sin\omega_c t \end{bmatrix} = V_c e^{i\omega_c t}$$

where $\omega_c$ is the carrier frequency and $V_c$ is the amplitude of the carrier signal. A sufficiently high carrier frequency is used such that the current response to this voltage is dominated by the inductance. Electric machines have saliencies, meaning that the inductances vary with rotor angle. These saliencies are caused by the geometry of the rotor and stator and saturation of iron paths in the rotor and stator. A good approximate model can be obtained by assuming that the machine possesses a single sinusoidal saliency. The stator and rotor reference frame inductances in this model are:

$$L_{\alpha\beta} = \begin{bmatrix} \Sigma L + \Delta L\cos(2\theta_\theta) & -\Delta L\sin(2\theta_\theta) \\ -\Delta L\sin(2\theta_\theta) & \Sigma L - \Delta L\cos(2\theta_\theta) \end{bmatrix}$$

-continued $$L_{dq} = \begin{bmatrix} L_d & 0 \\ 0 & L_q \end{bmatrix}$$

where $$\Delta L = \frac{L_d - L_q}{2} \text{ and } \Sigma L = \frac{L_d + L_q}{2}$$

The current caused by the voltage carrier can be expressed as:

$$i_{\alpha\beta} = I_{cp} e^{j(\omega_c t - \frac{\pi}{2})} + I_{cn} e^{j(\omega_c t + 2\theta_e - \frac{\pi}{2})}$$

where $$I_{cp} = \frac{V_c}{\omega_c} \cdot \frac{\Sigma L}{\Sigma L^2 - \Delta L^2}$$

is the positive-sequence carrier current, which is dependent on the mean inductance.

$$I_{cn} = \frac{V_c}{\omega_c} \cdot \frac{\Delta L}{\Sigma L^2 - \Delta L^2}$$

is the magnitude of the negative-sequence carrier current, which is dependent on the differential inductance. Rotor angle information is contained in the negative-sequence carrier current.

Figure 21:
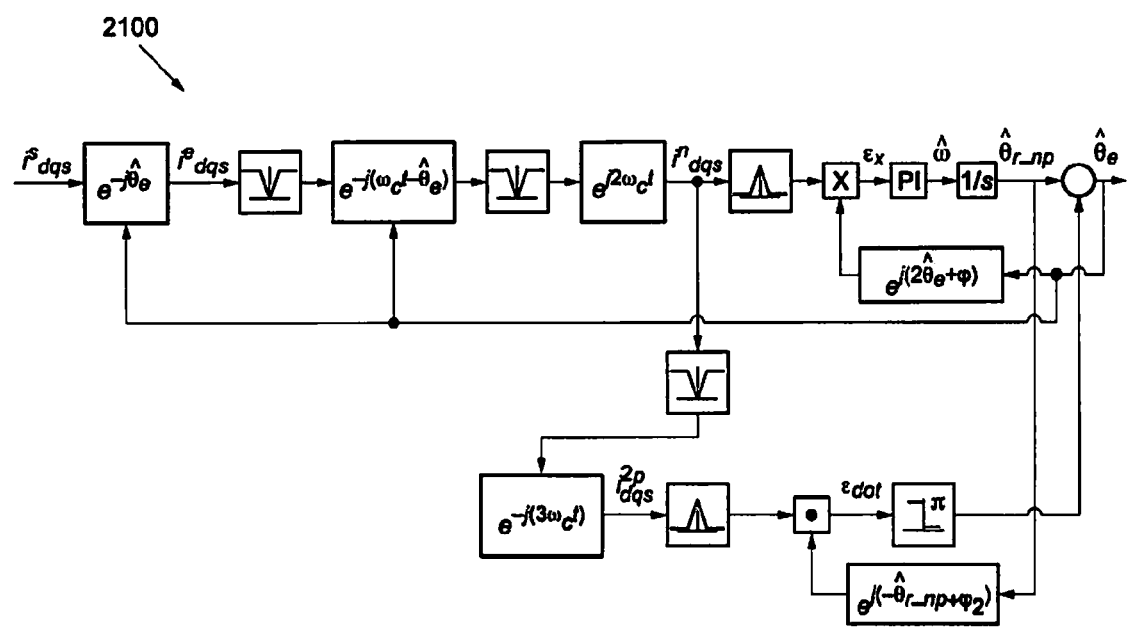
FIG. 21 illustrates a logic flow diagram of rotor angle extraction from an injected rotating vector, according to an embodiment of the present invention.

The goal is to remove everything but the negative-sequence carrier current. One implementation of signal processing that can be used to extract the rotor angle is shown in logic flow diagram 2100 of FIG. 21. The input signal is the stator current vector. First, unwanted spectral components are filtered out of the measured rotating current vector. In this scheme, the fundamental and positive sequence carrier currents are removed.

Next, the negative sequence carrier current is demodulated into the base band. This produces a rotating vector that is locked with the rotor saliency. An error signal to an observer is generated by taking the cross product of the actual rotating current vector and the estimated rotating vector. By properly selecting the observer gains, the estimated rotor angular speed and angle will converge toward their actual physical values. The resultant signal is an estimate of rotor angle, which is extracted from the negative sequence carrier current obtained from these summed quantities.

The mean inductance of each pole or pole-pair in the bearingless MG is a function of the lateral rotor position because the resultant change in air gap between the rotor and stator causes inductance changes. This technique takes advantage of this fact. The positive sequence current of each pole or pole-pair system is dependent on the mean inductance. The approach is to inject a rotating voltage vector, then demodulate positive sequence current of each pole or pole-pair system. The positive sequence current (which is proportional to the mean inductance) is then used to estimate rotor lateral position at each pole. Next, this resultant position information is vectorially summed to calculate the rotor position estimate.

Flux Observation by Back-Emf Integration Method

This technique estimates the flux in each pole or pole-pair. The flux vector contains rotor angle information, which is used to generate the rotor angle estimate. The flux of each pole or pole-pair is a function of the air gap between the rotor and stator (thus, the rotor lateral position), and thus contains rotor lateral position information that is extracted.

The rotor angle can be obtained by observing the rotor flux vector, and the estimated angle is simply the argument of this vector. In the easiest implementation, this would be obtained by integrating the back-emf vector. In practice, this integration would have to be accomplished with a low pass filter that approximates an integrator, because any DC offset in the measured back-emf would cause the integrator to run off to infinity. This approach can work, but is not ideal due to inherent phase lag at lower frequencies.

Figure 22:
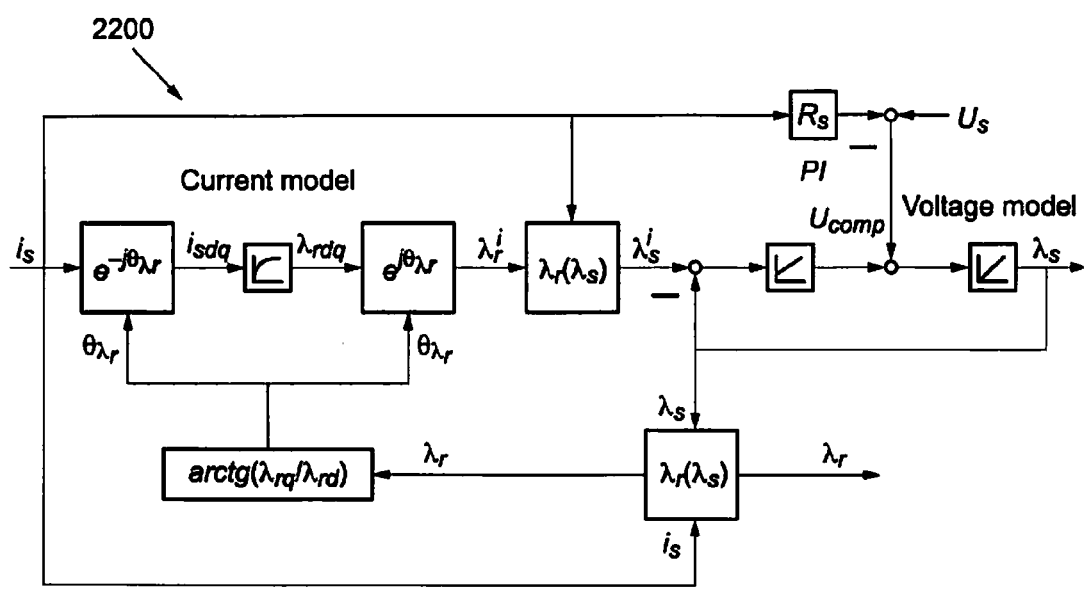
FIG. 22 illustrates a logic flow diagram of a flux observer, according to an embodiment of the present invention.

Another more accurate method is to use a closed loop approach to observing the motor flux. One approach to doing this is shown in logic flow diagram 2200 of FIG. 22. In this approach, voltage and current models are used to provide estimates of the flux. The input to the current model is the stator current vector. The flux vector estimate is determined from this current vector and the winding inductances. The current model creates a flux estimate, $\lambda_s^i$. The input to the voltage model is $U_s$, which is the measured voltage vector. This model uses measured voltages to create an estimate of flux linkage, $\lambda_s$, which is then compared to $\lambda_s^i$, and this error is forced to zero with the observer gains. The flux vector estimate from the voltage based model is now the pure integration of the back-emf. This can be done because it is now a closed loop system. The output of this scheme is an estimate of the flux linkage vector, $\lambda_s$, from which the rotor angle can be extracted.

Using the techniques discussed above and illustrated in FIG. 22, the flux is observed by back-emf integration, and the desired rotor angle is extracted from the resulting flux vector. Note that in this case, the input voltage vector is a sum of all of the voltages, and the stator current vector is the sum of all stator currents.

Using these techniques, flux observations are created to generate the desired flux estimates. Note that in this case, several flux vectors are created, one for each pole or pole-pair. Accordingly, the input voltage vectors contain only voltage information for each pole or pole-pair, and the input stator current vectors contain only current information for each pole or pole-pair.

For the small air gaps in this system, these calculated fluxes are directly proportional to the air gap, and thus the rotor position. Lateral position is determined by vectorially adding the observed flux for each pole or pole-pair.

Novel Reference Frame Application Method

Figure 23:
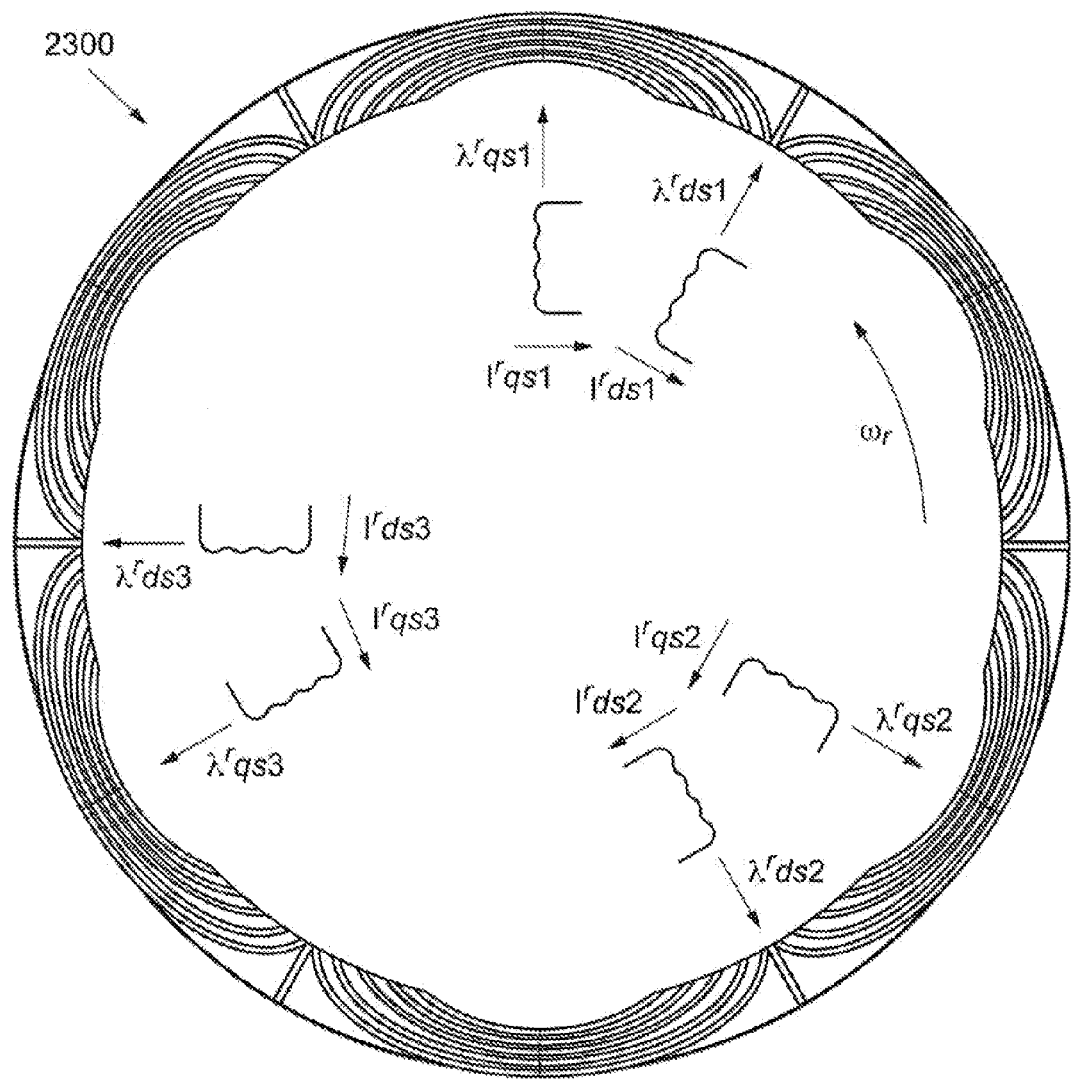
FIG. 23 illustrates a novel reference frame, according to an embodiment of the present invention.

This sensorless method involves use of a novel reference frame. Use of this new reference frame enables the theoretical windings used in FOC to follow the rotor poles, as opposed to previous schemes, which follow stator windings. This allows higher fidelity in generating arbitrary MMF waves, which will allow smoother, more constant, more evenly spaced force generation. An example of this new reference frame implementation 2300 is shown in FIG. 23. More specifically, FIG. 23 shows how the new reference frame can be seen as six theoretical coils which move with the rotor. These coils are driven by six currents, namely: $I_{qs1}^r$, $I_{ds1}^r$, $I_{qs2}^r$, $I_{ds2}^r$, $I_{qs3}^r$, $I_{ds3}^r$. By controlling these six currents, the six rotor flux linkages, $\lambda_{qs1}^r$, $I_{ds1}^r$, $I_{qs2}^r$, $I_{ds2}^r$, $I_{qs3}^r$, $I_{ds3}^r$, are completely controlled. The torque and lateral force applied to the motor rotor is completely determined by these six flux linkages. This is different than previous approaches because in the previous approaches, these currents and fluxes were stationary with the windings. This new approach allows the application of a much smoother applied force to the rotor.

This technique can be used for angle estimation, but for now is directed toward lateral position determination. It can be implemented using either the high speed rotating voltage vector injection method or the flux observation by back-emf integration method. Note that one benefit of this approach is that because the reference frame follows the rotor poles, the measured motor quantities (i.e., flux, voltage, current) have no angular component.

In this approach, the voltage vector injection or flux observation techniques are used to calculate the pole or pole-pair quantities to generate lateral position information, as described above. However, the difference is they are applied using the new reference frame. That is, inputs and outputs are selected using the new reference frame.

The flywheel systems discussed herein are controlled using electronic controllers of a control system. FIG. 24 illustrates a control system for controlling and monitoring the operations one or more flywheel systems, according to an embodiment of the present invention. System 2400 includes a supervisor controller 2420, a local data interface 2430, a DC bus and force, torque, and speed ("DC-FTS") controller 2440, six motor current controllers 2450, and an axial MB controller 2460. Additionally, supervisor controller 2420 interfaces with an external grid or flywheel farm control system 2410. Each of the controllers includes a processor as well as respective software, and communicates via data buses. The processors may be any type of general or specific purpose processor, including a central processing unit ("CPU") or application specific integrated circuit ("ASIC"). System 2400 further includes memory (not shown) for storing information and instructions to be executed by the processors. The memory can be comprised of any combination of random access memory ("RAM"), read only memory ("ROM"), flash memory, cache, static storage such as a magnetic or optical disk, or any other types of non-transitory computer-readable media or combinations thereof. Additionally, system 2400 includes a communication device (not shown), such as a transceiver, to wirelessly provide access to a telecommunications network.

Non-transitory computer-readable media may be any available media that can be accessed by the processors and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Supervisor controller 2420 provides high-level command and control for the flywheel system, including power interface sensors, the environmental conditions, and local and remote communication interfaces. This controller regulates the voltage and current of the output power bus and monitors the environmental sensors (temperature, humidity, vacuum level, seismic activity, etc.) via interface 2421. Supervisor controller 2420 provides commands to and receives status from DC-FTS controller 2440 via bus 2425. Additionally, supervisor controller 2420 provides status to and receives commands from the grid or flywheel farm control system 2410 via bus 2415, and provides status to and receives commands from local data interface 2430 via bus 2435.

DC-FTS controller 2440 provides levitation and rotation current commands to motor current controllers 2450, and provides levitation commands to axial magnetic bearing controller 2460. DC-FTS controller 2440 also regulates the DC power bus. DC-FTS controller 2440 receives feedback information from radial position sensors, DC bus voltage and current, and phase voltage via bus 2441. DC-FTS controller 2440 also receives commands from and provides status to supervisor controller 2420 via bus 2425. Additionally, DC-FTS controller 2440 provides commands to and receives status from the six motor control current controllers 2450 via bus 2445, and provides commands to and receives status from axial MB controller 2460 via bus 2446.

The six motor current controllers 2450 regulate the motor currents for the bearingless motors. Motor current controllers 2450 receive phase current feedback via bus 2451. Motor current controllers 2450 receive current commands from DC-FTS controller 2440 via bus 2445, and issue control commands to the motor inverters via bus 2455.

Axial magnetic bearing controller 2460 controls levitation of the axial magnetic bearing. Axial magnetic bearing controller 2460 receives axial position sensor feedback via bus 2461, and receives levitation commands from DC-FTS controller 2440 via bus 2446. Axial magnetic bearing controller 2460 also issues control commands to the axial magnetic bearing inverter via bus 2465.

Supervisor controller 2420 is further coupled via bus 2435 to a local data interface 2430, which includes a display, such as a Liquid Crystal Display ("LCD"), for displaying information to a user. A keyboard and a cursor control device, such as a computer mouse, enable a user to interface with system 2400. However, in certain embodiments such as those for mobile computing implementations, a physical keyboard and mouse may not be present, and the user may interact with the device solely through the display and/or a touchpad (not shown). Any type and combination of input devices may be used as a matter of design choice.

In one embodiment, the memory stores software modules that provide functionality when executed by the processors. The modules include an operating system. Further, in some embodiments, different control functionality may be carried out by multiple processors, and some or all of the processors may be located remotely from the flywheel system. For example, system 2400 may be integrated with or interface with some or all of the components of an electronics box of the flywheel system, such as electronics box 205 of FIG. 2. System 2400 may be configured to control and/or communicate with multiple flywheel systems in some embodiments. System 2400 may include one or more additional functional modules that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a central rotor configured as a flywheel to store energy, said central rotor extending vertically and rotating about a vertical axis;
   a magnetic bearing located above the central rotor to levitate the rotor along the vertical axis;
   a first bearingless motor located above the central rotor; and
   a second bearingless motor located below the central rotor; wherein
   the first bearingless motor and the second bearingless motor are configured to simultaneously suspend the central rotor in a radial direction relative to the vertical axis and to rotate the central rotor about the vertical axis;
   an active or a passive axial magnetic bearing configured to provide axial control of the central rotor; and
   wherein the active or passive magnetic bearing has a magnet bias configured to lift a portion or all of a weight of the central rotor near a nominal gap without current.

2. The apparatus of claim 1, wherein a combination of a mass, a radius, and a speed of the central rotor are sufficient to operate the apparatus as a generator continuously for greater than fifteen minutes.

3. The apparatus of claim 1, wherein the central rotor has a cylindrical shape.

4. The apparatus of claim 1, wherein the first bearingless motor and the second bearingless motor are configured to suspend the central rotor in a non-vertical direction.

5. The apparatus of claim 1, wherein the first bearingless motor and the second bearingless motor comprise bearingless motor/generators.

6. The apparatus of claim 1, wherein at least one of the first bearingless motor and the second bearingless motor comprises a rotor outside of a stator.

7. The apparatus of claim 1, further comprising:
   a vacuum housing in which the central rotor spins, thereby eliminating power losses due to air drag.

8. The apparatus of claim 1, wherein the bearingless motors and axial magnetic bearings are configured to utilize power electronics to interface with the power grid or external power bus.

9. An apparatus, comprising:
   a central rotor configured as a flywheel to store energy, said central rotor extending vertically and rotating about a vertical axis;

a magnetic bearing located above the central rotor to levitate the rotor along the vertical axis;

a first bearingless motor located above the central rotor; and a second bearingless motor located below the central rotor; wherein the first bearingless motor and the second bearingless motor are configured to simultaneously suspend the central rotor in a radial direction relative to the vertical axis and to rotate the central rotor about the vertical axis;

an active or a passive axial magnetic bearing configured to provide axial control of the central rotor; and wherein the active or passive magnetic bearing comprises:

a mounting ring configured to hold parts of the active or passive axial magnetic bearing;

a magnetic inner pole and a magnetic outer pole;

a magnet ring; and a coil positioned between the inner pole and the outer pole.

10. An apparatus, comprising:

a central rotor configured as a flywheel to store energy, said central rotor extending vertically and rotating about a vertical axis;

a magnetic bearing located above the central rotor to levitate the rotor along the vertical axis;

a first bearingless motor located above the central rotor; and a second bearingless motor located below the central rotor; wherein the first bearingless motor and the second bearingless motor are configured to simultaneously suspend the central rotor in a radial direction relative to the vertical axis and to rotate the central rotor about the vertical axis;

a mechanical touchdown bearing system configured to support the central rotor when a levitation system is not powered, and/or during a failure of the levitation system;

where in the mechanical touchdown bearing system comprises:

one or more bearings configured to support axial and radial loads;

one or more touchdown surfaces configured to provide an interface between the central rotor and the one or more bearings; and one or more spring/damper mounting structures configured to limit a force and displacement of the central rotor when operating on the mechanical touchdown bearing system.

11. The apparatus of claim 10, wherein a combination of a mass, a radius, and a speed of the central rotor are sufficient to operate the apparatus as a generator continuously for greater than fifteen minutes.

12. The apparatus of claim 10, wherein the central rotor has a cylindrical shape.

13. The apparatus of claim 10, wherein the first bearingless motor and the second bearingless motor are configured to suspend the central rotor in a non-vertical direction.

14. The apparatus of claim 10, wherein the first bearingless motor and the second bearingless motor comprise bearingless motor/generators.

15. The apparatus of claim 10, wherein at least one of the first bearingless motor and the second bearingless motor comprises a rotor outside of a stator.

16. The apparatus of claim 10, further comprising:

a vacuum housing in which the central rotor spins, thereby eliminating power losses due to air drag.

17. The apparatus of claim 10, wherein the bearingless motors and axial magnetic bearings are configured to utilize power electronics to interface with the power grid or external power bus.

18. An apparatus, comprising;

a central rotor configured as a flywheel to store energy, said central rotor extending vertically and rotating about a vertical axis;

a magnetic bearing located above the central rotor to levitate the rotor along the vertical axis;

a first bearingless motor located above the central rotor; and a second bearingless motor located below the central rotor; wherein the first bearingless motor and the second bearingless motor are configured to simultaneously suspend the central rotor in a radial direction relative to the vertical axis and to rotate the central rotor about the vertical axis;

wherein operation of the apparatus is controlled by a control system;

wherein the control system comprises:

a supervisory controller configured to control overall operation of the apparatus and to interface with local and remote users;

one or more motor current controllers configured to provide commands to motor power electronics;

one or more magnetic bearing controllers configured to provide commands to magnetic bearing power electronics; and a DC bus, force, torque, and speed controller configured to regulate a local power bus and to provide commands to the one or more motor current controller and the one or more magnetic bearing controllers.

19. The apparatus of claim 18, wherein a combination of a mass, a radius, and a speed of the central rotor are sufficient to operate the apparatus as a generator continuously for greater than fifteen minutes.

20. The apparatus of claim 18, wherein the first bearingless motor and the second bearingless motor are configured to suspend the central rotor in a non-vertical direction.

* * * * *